(12) United States Patent
Stafford et al.

(10) Patent No.: US 9,437,109 B1
(45) Date of Patent: Sep. 6, 2016

(54) EMERGENCY SAFETY MARKER SYSTEM

(71) Applicants:Joseph V. Stafford, White Bear Lake, MN (US); Jan C. Lahtonen, Isanti, MN (US); Bruce S. Allen, Brooklyn Center, MN (US)

(72) Inventors: Joseph V. Stafford, White Bear Lake, MN (US); Jan C. Lahtonen, Isanti, MN (US); Bruce S. Allen, Brooklyn Center, MN (US)

( * ) Notice: Subject to any disclaimer, the term of this patent is extended or adjusted under 35 U.S.C. 154(b) by 43 days.

(21) Appl. No.: 14/481,598

(22) Filed: Sep. 9, 2014

Related U.S. Application Data

(60) Provisional application No. 62/016,407, filed on Jun. 24, 2014.

(51) Int. Cl.
| | |
|---|---|
| *G08G 1/095* | (2006.01) |
| *G08G 1/09* | (2006.01) |
| *F21L 4/02* | (2006.01) |
| *F21V 21/06* | (2006.01) |

(52) U.S. Cl.
CPC . *G08G 1/09* (2013.01); *F21L 4/02* (2013.01); *F21V 21/06* (2013.01)

(58) Field of Classification Search
CPC ............. B60Q 7/00; F21L 4/02; F21V 21/06
USPC ...... 340/473, 933, 573.4, 815.4, 321, 908.1, 340/332; 362/184, 153.1, 231, 171, 249.02, 362/102, 158, 120, 285
See application file for complete search history.

(56) References Cited

U.S. PATENT DOCUMENTS

| | | | |
|---|---|---|---|
| 1,228,615 A | 6/1917 | Stafford | |
| 2,611,019 A | 9/1952 | Warner | |
| 2,949,531 A | 8/1960 | Lemelson | |
| 3,128,951 A | 4/1964 | Nicholl | |
| 3,426,343 A | 2/1969 | Carlson | |
| 4,055,840 A * | 10/1977 | Uchytil | B60Q 7/005 116/63 P |
| 4,292,627 A * | 9/1981 | Knight | E01F 9/0124 116/63 C |
| 4,480,294 A | 10/1984 | Carboni | |
| 5,079,679 A | 1/1992 | Chin-Fa | |
| 5,453,729 A | 9/1995 | Chu | |
| 5,457,449 A * | 10/1995 | Kuning | G08G 1/0955 340/905 |
| 5,577,824 A | 11/1996 | Wright | |
| 5,590,956 A * | 1/1997 | Messana | F21V 29/02 362/320 |
| 5,622,423 A | 4/1997 | Lee | |
| 5,661,474 A * | 8/1997 | Douglas | G05G 1/02 200/86 A |

(Continued)

*Primary Examiner* — Hoi Lau
(74) *Attorney, Agent, or Firm* — Glen E. Schumann; Moss & Barnett

(57) ABSTRACT

An electronic lighted safety marker system used by emergency responders to warn motorists of the presence of an accident scene ahead on or beside the roadway is provided by the invention. Such safety marker can be deployed individually or in groups by the emergency responder along the perimeter of the accident scene and ideally ahead of it along the roadway to provide adequate warning to approaching motorists to avoid the accident scene. The safety marker contains a power source, a light panel, a protective shield for the light panel, and electronic circuitry for controlling the operation of the lights in a predetermined frequency or pattern, and may be automatically actuated and self-righting when it is dropped onto the ground or other hard surface. The safety marker can also contain an incursion warning system against incoming vehicles, an early warning radar transponder for sending a warning message to such incoming vehicles, a GPS location detector and transmitter for providing the location of the safety marker and its associated accident scene to a central dispatcher, and a gunshot sensor for detecting the occurrence of gunfire around the accident scene and its location to provide that information to the central dispatcher.

25 Claims, 21 Drawing Sheets

(56) References Cited

U.S. PATENT DOCUMENTS

| | | |
|---|---|---|
| 5,684,452 A | 11/1997 | Wang |
| 5,697,695 A | 12/1997 | Lin et al. |
| 5,754,124 A * | 5/1998 | Daggett .................... F21S 9/02 320/137 |
| 5,760,686 A * | 6/1998 | Toman .................... G08B 5/006 340/331 |
| 5,865,524 A | 2/1999 | Campman |
| 5,900,826 A * | 5/1999 | Farber ................. G08G 1/0955 116/63 P |
| 6,288,651 B1 * | 9/2001 | Souza ..................... E01F 9/014 200/86 A |
| 6,480,115 B2 | 11/2002 | Ghahramani |
| 6,808,291 B1 * | 10/2004 | Aylward .................. B60Q 7/00 362/186 |
| 6,899,441 B2 * | 5/2005 | Chen ....................... B60Q 7/00 340/321 |
| 6,952,168 B2 | 10/2005 | Recko, Jr. et al. |
| 7,011,423 B2 * | 3/2006 | Chen ....................... B60Q 7/00 340/321 |
| 7,021,782 B1 | 4/2006 | Yerian |
| 7,030,777 B1 * | 4/2006 | Nelson .................. G08G 1/164 340/907 |
| 7,030,929 B2 | 4/2006 | Chang et al. |
| 7,063,444 B2 * | 6/2006 | Lee ....................... F21L 14/00 362/184 |
| 7,195,370 B2 | 3/2007 | Riblett et al. |
| 7,224,271 B2 * | 5/2007 | Wang ...................... B60Q 7/00 248/155.4 |
| 7,230,546 B1 * | 6/2007 | Nelson .................... G08G 1/01 340/907 |
| 7,350,328 B1 * | 4/2008 | Garcia .................. E01F 9/0126 116/63 P |
| 7,878,678 B1 | 2/2011 | Stamatatos et al. |
| 7,905,622 B2 | 3/2011 | Nielson et al. |
| 7,997,764 B1 * | 8/2011 | Nielson ................ E01F 9/0122 340/907 |
| 8,427,076 B2 * | 4/2013 | Bourquin ........... H05B 37/0245 315/149 |
| 2002/0136005 A1 * | 9/2002 | Lee ........................... F21L 4/00 362/171 |
| 2003/0210975 A1 * | 11/2003 | Garcia .................... E01F 9/014 414/467 |
| 2004/0240204 A1 * | 12/2004 | Russ ..................... A42B 3/0433 362/231 |
| 2006/0104054 A1 * | 5/2006 | Coman ................... E01F 9/065 362/153.1 |
| 2006/0133074 A1 | 6/2006 | Lai |
| 2008/0036584 A1 * | 2/2008 | Lang ....................... B60Q 7/00 340/473 |
| 2008/0094822 A1 | 4/2008 | Hsu |
| 2008/0125970 A1 * | 5/2008 | Scheckler ............... E01F 9/005 701/469 |
| 2011/0249430 A1 * | 10/2011 | Stamatatos .......... B60Q 1/2615 362/184 |
| 2012/0194353 A1 * | 8/2012 | Groves ............ G08G 1/096716 340/907 |
| 2014/0096712 A1 * | 4/2014 | Houle .................... E01F 9/014 116/63 P |
| 2015/0123817 A1 * | 5/2015 | Almalki ................... F03D 9/00 340/907 |

* cited by examiner

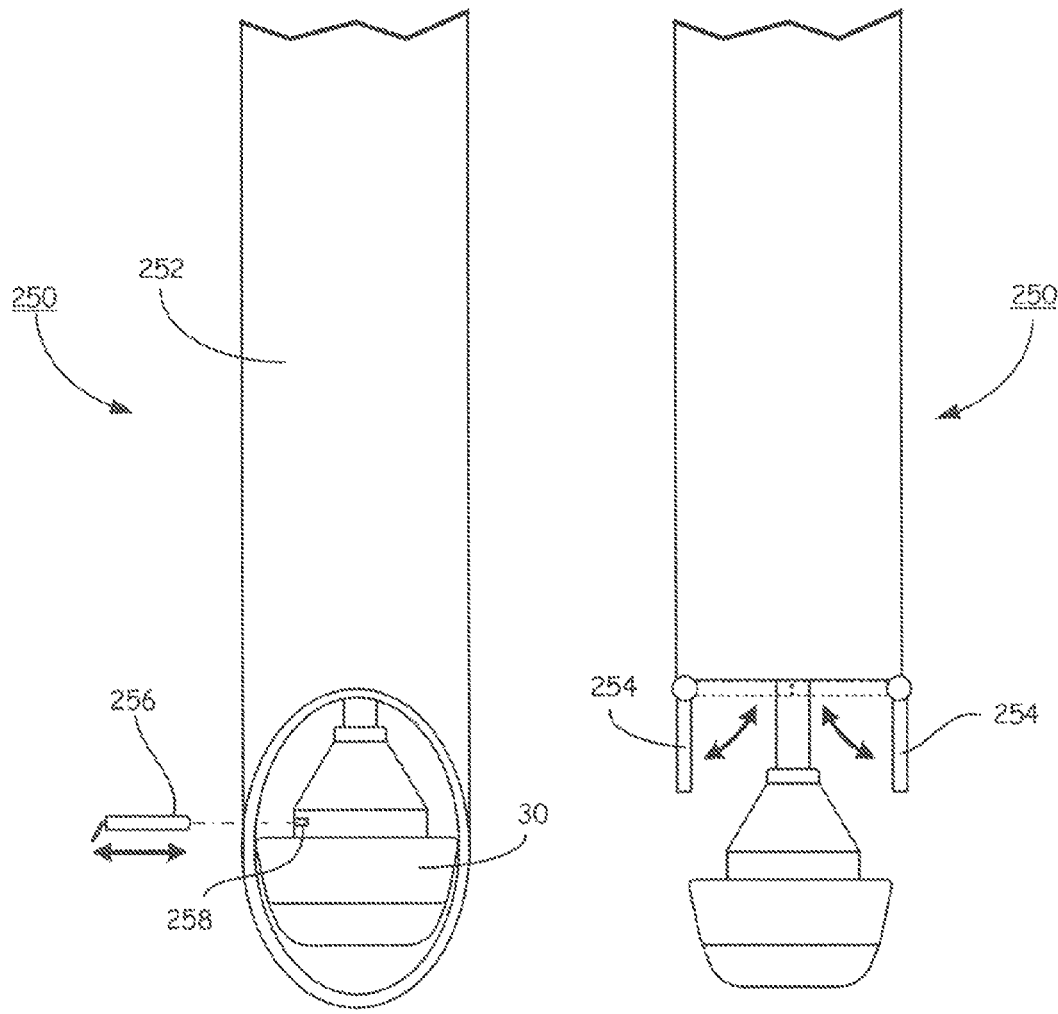

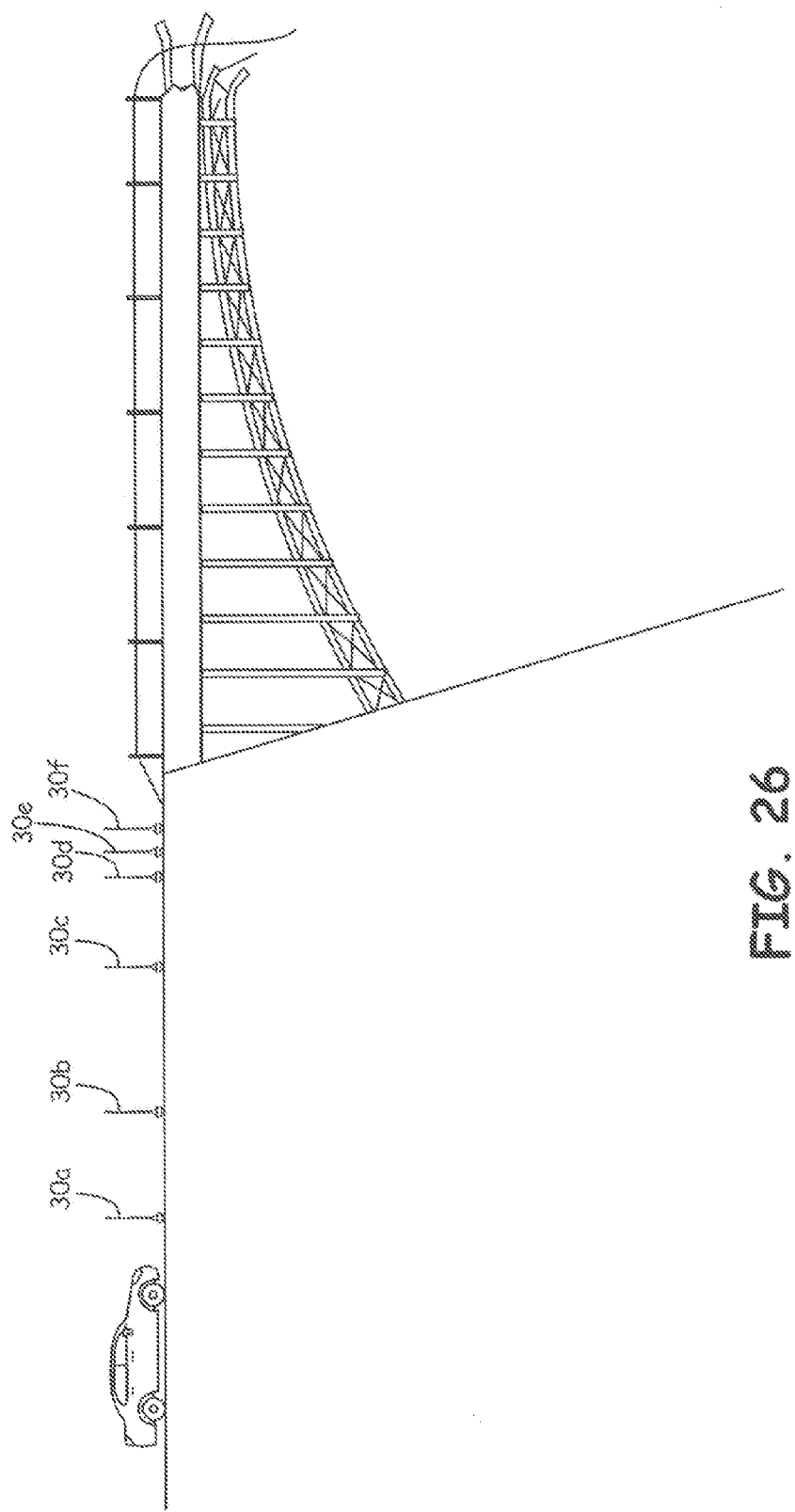

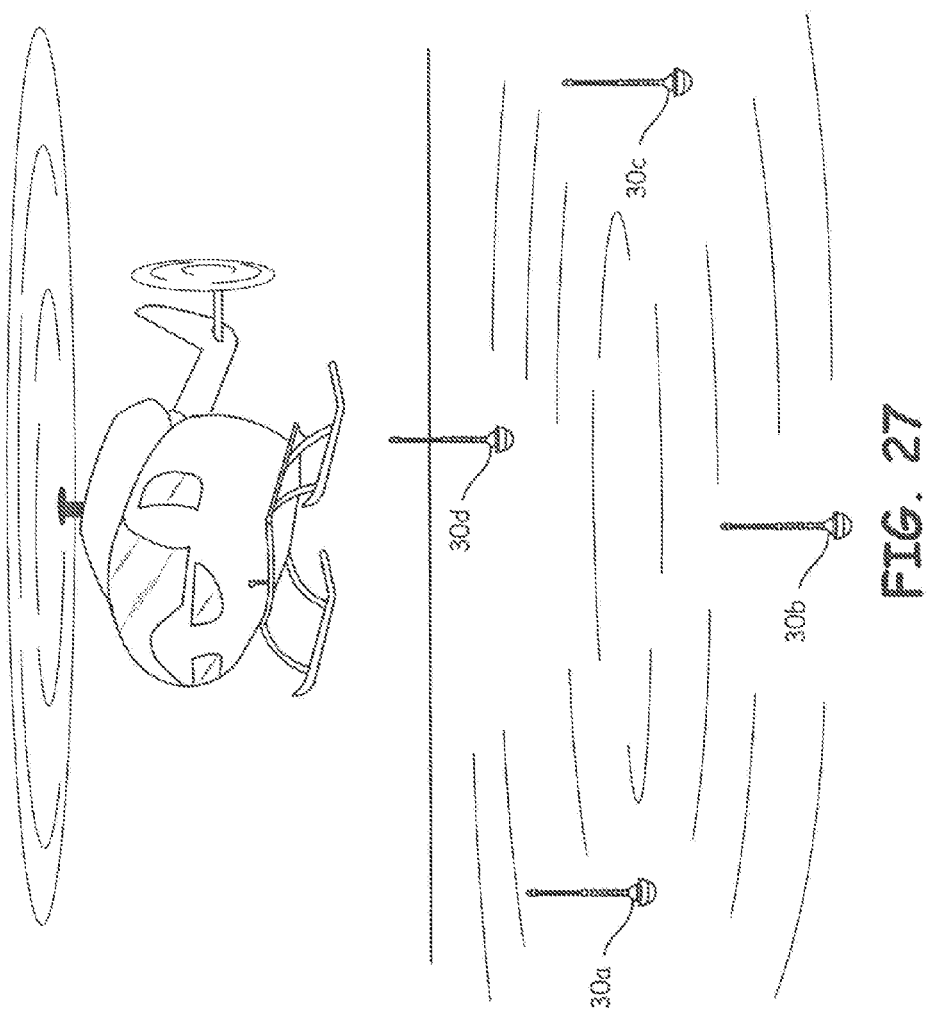

EMERGENCY SAFETY MARKER SYSTEM

CROSS-REFERENCE TO RELATED APPLICATION

This application claims the benefit of the United States provisional application No. 62/016,407 entitled "Emergency Safety Marker System" filed on Jun. 24, 2014, which is hereby incorporated by reference.

FIELD OF THE INVENTION

This invention relates generally to flares used by emergency responder personnel to mark an accident scene to warn other people to stay away, and more specifically to electronic safety markers that may be deployed by an emergency responder without risk of physical injury while providing warning to that responder of any reckless motorist approaching the accident scene.

BACKGROUND OF THE INVENTION

An integral aspect of daily life is the use of motor vehicles to transport people from one location to another location. Changes in local economies and housing prices have compelled many people to live further from where they work, shop, or seek entertainment. This means that the number of vehicle miles traveled by motorists in many states and cities continue to climb year after year.

Efforts have been made by many states to enhance the speed, efficiency, and convenience of modern road systems. Motor vehicles have also become safer. Despite these efforts, however, roughly 30,000 people die in vehicle accidents in the United States each year in addition to 2 million other injuries arising from the more than 10 million vehicle accidents reported annually.

Vehicle accident scenes are very dangerous, because they represent a stationary obstacle amidst oncoming vehicles travelling at high speeds. Police officers, sheriff deputies, and state troopers are usually the first responders to arrive upon the accident scene. In addition to taking care of traumatized injured drivers and passengers in the damaged vehicles directly involved in the accident, they must set up the initial security perimeter aimed at diverting oncoming motorists safely around the accident scene. This can be very dangerous to law enforcement personnel, as well as other safety responders like ambulances, paramedics, and tow trucks. These dangers are further compounded by darkness and inclement weather. Each year in the U.S. alone, millions of law enforcement officers and first responders risk their lives working on roads, and thousands are injured or die each year in the process.

Many states have enacted "move over" laws that require drivers to slow down or change lanes to move away from stopped emergency vehicles. While these laws are meant to enhance the safety of accident scenes, too many law enforcement officers and other emergency responders are injured or die due to reckless, inattentive, or impaired incoming motorists approaching the accident scene.

It is therefore critical that law enforcement officers and first responders have the necessary equipment to mark the perimeter of an accident scene to warn approaching motorists to stay away. Moreover, it is important that such equipment be deployed in a manner that is safe to the law enforcement officers or first responders. The most basic article of traffic safety marker equipment is the ubiquitous orange cone or pylon. These cones or pylons are portable due to their light weight, and visible over short distances due to their fluorescent orange color. See e.g., U.S. Published Application 2008/0125970 filed by Scheckler. But, they are largely invisible at night, and can easily be blown or knocked over to interfere with their function as a safety hazard marker.

Another common tool used by law enforcement officers and other emergency responders are road-side flares. They constitute sealed containers holding phosphorescent chemicals that can be broken open to ignite the chemicals. The resulting burning fire emits a colored light that is clearly visible at night. While the flares can be dropped along the perimeter of the accident scene by the law enforcement officer, they burn for relatively short time periods, thereby requiring replacement flares to be deployed if the accident scene is not cleared quickly. They also require the law enforcement officer to walk to the edge of the accident scene in the path of rapidly approaching motor vehicles in order to drop the ignited flares onto the pavement.

Electronic flares exist in the market for replacing the traditional chemical-burning phosphorescent flares. U.S. Published Application 2004/0240204 filed by Russ at al. discloses such an electronic flare having a cylindrical housing containing a battery and plurality of light-emitting diode ("LED") lights positioned around the circumference of the housing. Such a flare merely needs to be turned on via its switch, and can be placed on the ground as a marker. U.S. Published Application 2006/0104054 filed by Coman discloses a dome-shaped flare assembly with a flat bottom and a reflector that disperses light radially. But, these types of electronic flares require manual actuation and deployment along the accident scene pavement, which can be dangerous in the face of high-speed oncoming traffic.

Efforts have also been made to equip law enforcement officers with hand-held light wands that can be used to direct traffic. These devices operate like flash lights except that a transparent tube containing a plurality of battery-powered lights extends from the handle for radiating the light for 360° viewing. The light bulbs can be LED lights for improved visibility. See e.g., U.S. Pat. No. 5,079,679 issued to Chin-Fa, and U.S. Published Application 2008/0094822 filed by Hsu. A colored reflecting tube surrounding the light bulbs can produce the appearance of colored lights for increased attention by motorists. See U.S. Pat. No. 5,622,423 issued to Lee. Alternatively, colored light bulbs or colored light bulbs in combination with white light bulbs can be employed to create sections of different colors along the light wand. See, e.g., U.S. Pat. No. 2,611,019 issued to Warner; U.S. Pat. No. 5,697,695 issued to Lin at al.; and U.S. Pat. No. 5,865,524 issued to Campman.

But in the case of a roadside accident, it may represent an inefficient use of resources to devote a police officer to waving a hand-held light wand to motion approaching motorists away from the accident scene. In some cases, only one police officer may be present at the accident scene. Therefore, a self-standing light device that can be quickly set up by the policeman on the pavement along the perimeter of the accident scene is more convenient. Thus, the light wand can be attached to a tripod base. See, e.g., U.S. Pat. No. 6,899,441 issued to Chen; U.S. Pat. No. 7,011,423 also issued to Chen; U.S. Pat. No. 7,063,444 issued to Lee et al.; and U.S. Pat. No. 7,224,271 issued to Wang. See also U.S. Published Applications 2002/0136005 filed by Lee; 2006/0133074 filed by Lai; and 2008/0036584 filed by Lang et al. In many cases, the tripod legs are permanently attached to the light stick portion of the light wand devices. U.S. Pat. No. 4,055,840 issued to Uchytil at al. shows a safety warning device having a housing and pivotal leg in which a battery-powered light source disposed in a reflector to radiate light which is reflected off a plurality of flexible reflective strips creates the visual appearance of a burning incendiary flare.

U.S. Pat. No. 5,684,452 issued to Wang discloses a warning device consisting of a tripod flash light with a pivoting head lamp. Such a portable device can be set up to direct the light source at varying heights. U.S. Pat. No. 7,021,782 issued to Yerian substitutes a ballast-filled base for the tripod legs connected to the light stick portion of the safety marker device to reduce the chances of it blowing over or getting knocked over.

In other embodiments of electronic safety markers, an electronic light stick is structured so that it can be inserted into the top of a standard traffic cone. See, e.g., U.S. Pat. No. 2,949,531 issued to Lemelson; U.S. Pat. No. 5,453,729 issued to Chu; and U.S. Pat. No. 5,577,824 issued to Wright. The traffic cone serves as the base for the light stick unit.

The light source used in safety markers can also flash for added attention and visibility. See U.S. Pat. Nos. 7,905,622 and 7,997,764 issued to Nielson; and U.S. Pat. No. 7,195,370 issued to Riblett et al.

U.S. Pat. No. 5,754,124 issued to Daggett et al. discloses an electrical hazard warning system comprising a charging base for a couple of transparent, cone-shaped markers containing a light bulb. The electronics are placed in the bottom of the marker to provide ballast for keeping the markers upright when they are positioned on the ground. The charging base can be placed in the trunk of a police car so that the marker devices are readily available for deployment at accident scenes.

Other safety marker devices available in the industry contain a rounded base that is filled with ballast, so that if the device is tipped over, it will stand upright again. See, e.g., U.S. Pat. No. 1,228,615 issued to Stafford; U.S. Pat. No. 5,590,956 issued to Messana et al.; and U.S. Pat. No. 6,808,291 issued to Aylward at al. U.S. Pat. No. 7,030,929 issued to Chang at al. claims to accomplish the same result using an ovate (egg-shaped) housing.

Other electric safety marker devices available in the industry are compact in their storage state. For example, U.S. Published Application 2014/0096712 issued to Houle et al. teaches a hollow tetrahedron with four vortexes formed by connecting rods. The device can be expanded from its collapsed state to its tetrahedral state, and a light positioned on the top vortex allows it to act as a deployable safety marker. U.S. Pat. No. 3,426,343 issued to Carlson discloses a light unit comprising a base containing a battery and a light bulb with a cone-shaped top that can be manually pulled upwards to produce a red colored conical housing that is lit up by the light bulb.

But all of these prior art safety markers require manual actuation and deployment by the police officer or other emergency responder. This can expose the police officer or other emergency responder to the risk of physical injury by oncoming motorists.

Still other safety marker devices are designed for rapid deployment by throwing or dropping them onto the ground. For example, U.S. Pat. No. 3,128,951 issued to Nicholl shows a substantially spherical shaped housing that is lit up by a light bulb contained inside and can be rolled along the ground. The lamp units are stored in a container, and they automatically light up upon their removal from their container. U.S. Pat. No. 4,480,294 issued to Carboni discloses a cubic lamp box having six identical sides. Light bulbs contained inside the box shine through windows in the housing sides. The light box is thrown along the ground, and when it comes to rest on one of its sides, the lights shine through the resulting side and top windows.

But, because such safety marker devices can roll freely along the ground, they cannot be deployed by the police officer or other emergency responder accurately at a particular location around the accident scene without being manually set in place at the desired location on the ground. Again, this produces the risk of physical injury for the person deploying the safety marker.

U.S. Pat. No. 6,480,115 issued to Ghahramani discloses a mine hazard marker that is deployed on a battlefield by a tank. It comprises a mast head with a flag and spring-actuated legs. When the marker devices is dropped on to the ground by the tank or tank operator, a skid plate impacted by the ground causes the legs to deploy using a mechanical mechanism. No light is associated with this marker device.

Still other safety markers containing LED lights contain radio frequency or infrared receivers. An operator can remotely turn on the lights by transmitting a radio frequency ("RF") or infrared ("IR") signal. See e.&, U.S. Pat. No. 7,878,678 issued to Stamatatos et al., and U.S. Published Application 2011/0249430 filed by Stamatatos et al.

Other marker devices can send warning signals or messages. For example, U.S. Pat. No. 6,952,168 issued to Recko, Jr. et al. teaches an audio module that can be set into the top of a warning cone. The module contains an infrared detector and an associated warning system message. Deployed by a janitor around a wet floor, the device senses an approaching pedestrian, and emits an audible warning message about the potential danger posed by the wet floor. U.S. Pat. No. 7,030,777 issued to Nelson at al. provides a cone-mounted roadway incursion alert system. A series of the devices are mounted onto traffic cones positioned around a construction one. When an approaching car physically hits one of the cones, an impact sensor in the device sends a warning message to the construction workers about the potential danger posed to them by the car.

U.S. Published Application 2008/0125970 issued to Scheckler discloses a traffic safety pylon with a GPS-locating and RF-signaling capability. A radio transmitter sends a signal to a central dispatcher for the location of the pylon based on the GPS unit contained in the pylon. See also U.S. Pat. No. 7,195,370 issued to Riblett et al.

Therefore, providing an electronic lighted safety marker system used by emergency responders to warn motorists on roadways to avoid an accident scene, and that can be deployed by such emergency responders with minimal risk to their own personal safety would be highly beneficial. Such safety marker system should simultaneously provide adequate prior warnings to motorists of the stationary accident scene, and to the emergency responders of reckless incoming motorists that may represent their own safety hazard to the emergency responder.

SUMMARY OF THE INVENTION

An electronic lighted safety marker system used by emergency responders to warn motorists on roadways of the presence of an accident scene ahead on the roadway or beside the roadway is provided by the invention. Such markers can be deployed individually or in groups by the emergency responder along the perimeter of the accident scene and ideally ahead of it along the roadway to provide adequate warning to approaching motorists to avoid the accident scene. The markers contain a power source, a light panel, a protective shield for the light panel, and electronic circuitry for controlling the operation of the lights in a predetermined frequency or pattern. One or more of the lights may be colored or operate in a strobe pattern for enhanced visibility for the motorists.

At the same time, the marker device has a self-righting base. An emergency responder can manually drop or drop via an electro-mechanical device the marker device from his vehicle, and have the marker device stand up in a substantially vertical orientation after it hits the ground. In this manner, the emergency responder need not leave the safety of his vehicle to deploy the marker on or along the roadway and therefore suffer the risk being struck by an approaching motorist.

The safety marker device should contain a low-impact sensor switch operatively connected to the electronic circuitry to automatically extend the light panel to its optimal height and turn on the lights when the marker device strikes the ground or other hard surface. The lights along the light panel should preferably be visible round a 360° perimeter for enhanced visibility to approaching motorists no matter what is the orientation of the marker device with respect to the roadway and motorists.

The safety marker device should also contain a high-impact sensor switch that detects when a reckless motorist directly approaching the accident scene hits the marker, and provides an audible warning sound or message to the emergency responder of the potential danger represented by the rapidly-approaching, out-of-control vehicle. By positioning several of the marker devices a predetermined distance ahead of the accident scene, the emergency responder can receive an adequate warning of the reckless, inattentive, or impaired approaching motorist with sufficient time to move out of the way to safety and thereby avoid personal injury while attending to the accident scene.

The safety marker devices can also contain a GPS transmitter for sending a signal regarding the location of the marker to a central dispatch department. In this manner, the central dispatch department can quickly send emergency help to an emergency responder who is injured by another motorist at the accident scene. The emergency responder can also send his own distress signal accompanied by the GPS location coordinates to the control dispatch department or another emergency responder to ask for help.

The safety marker device can also contain a transmitter for emitting an emergency radar signal. This transmitter constantly sends out a feedback radar signal triggered by the deployment of the device itself that can be received by vehicles equipped with on-board radar capabilities used to detect objects like other cars or animals in the roadway. The safety marker in this manner can send a warning to the driver of an oncoming vehicle to slow down or move to another lane to avoid the accident scene before a crash occurs. This will enhance the personal safety of the victims of the crash scene and the emergency responders.

This GPS location identification system also enables an emergency responder at an emergency scene like a land slide or fallen bridge to deploy one or more of the safety marker devices to alert subsequently dispatched emergency responders of the location of the emergency scene. This functionality allows the first emergency responder to leave the accident scene to attend to other duties secure in the knowledge that his backup responders will find the emergency scene.

The GPS location identification system contained in the safety marker devices are also useful for providing guidance to approaching helicopters. The emergency responder may position a plurality of safety markers around the perimeter of a safe landing zone in a field to alert via the GPS functionality the pilot to the location of the zone in which he should land his helicopter safely away from hazards like overhead power lines and tees. This is particularly useful for pilots who need to land helicopters at night or in inclement weather like fog.

The safety marker of the present invention may also comprise a hand-held unit comprising a power source, a light panel, a protective shield for the light panel, and electronic circuitry for controlling the operation of the lights in a predetermined frequency or pattern. One or more of the lights may be colored or operate in a strobe pattern for enhanced visibility for the motorists. This hand-held unit also comprises a manually-operated actuation switch connected to the electronic circuitry for extending the light panel and turning on the lights. The lights along the light panel should preferably be visible around a 360° perimeter for enhanced visibility to approaching motorists no matter what is the orientation of the marker device to the roadway and motorists. The hand-held unit may be used by an emergency responder to direct traffic at an accident scene, or be mounted to the top of a conventional traffic cone to provide a deployed safety marker. Accordingly, this handheld unit also comprises a high-impact sensor switch that detects when a reckless motorist directly approaching the accident scene hits the marker, and provides an audible warning sound or message to the emergency responder of the potential danger, as well as a GPS transmitter for sending a signal regarding the location of the marker to a central dispatch department, transmitter for emitting an feedback radar signal to on-board radar receiver units in oncoming vehicles. By positioning several of the marker devices mounted to cones a predetermined distance ahead of the accident scene, the emergency responder can receive an adequate warning of a reckless, inattentive, or impaired approaching motorist with sufficient time to move out of the way to safety and thereby avoid personal injury while attending the accident scene, and warn the motorist ahead of time via the feedback radar signal to slow down or switch lanes to avoid the accident scene.

BRIEF DESCRIPTION OF THE DRAWINGS

In the accompanying drawings:

FIG. 24 is a perspective view of the vertical storage housing for the gravity drop deployment system of FIG. 23.

FIG. 25 is a perspective view of the vertical storage housing of an alternative embodiment for the gravity drop deployment system of FIG. 23.

FIG. 26 is a perspective view of the safety marker system of the present invention deployed adjacent to a damaged bridge.

FIG. 27 is a perspective view of the safety marker system of the present invention deployed to mark a landing zone for a helicopter.

DETAILED DESCRIPTION OF THE PREFERRED EMBODIMENT

Figure 1:
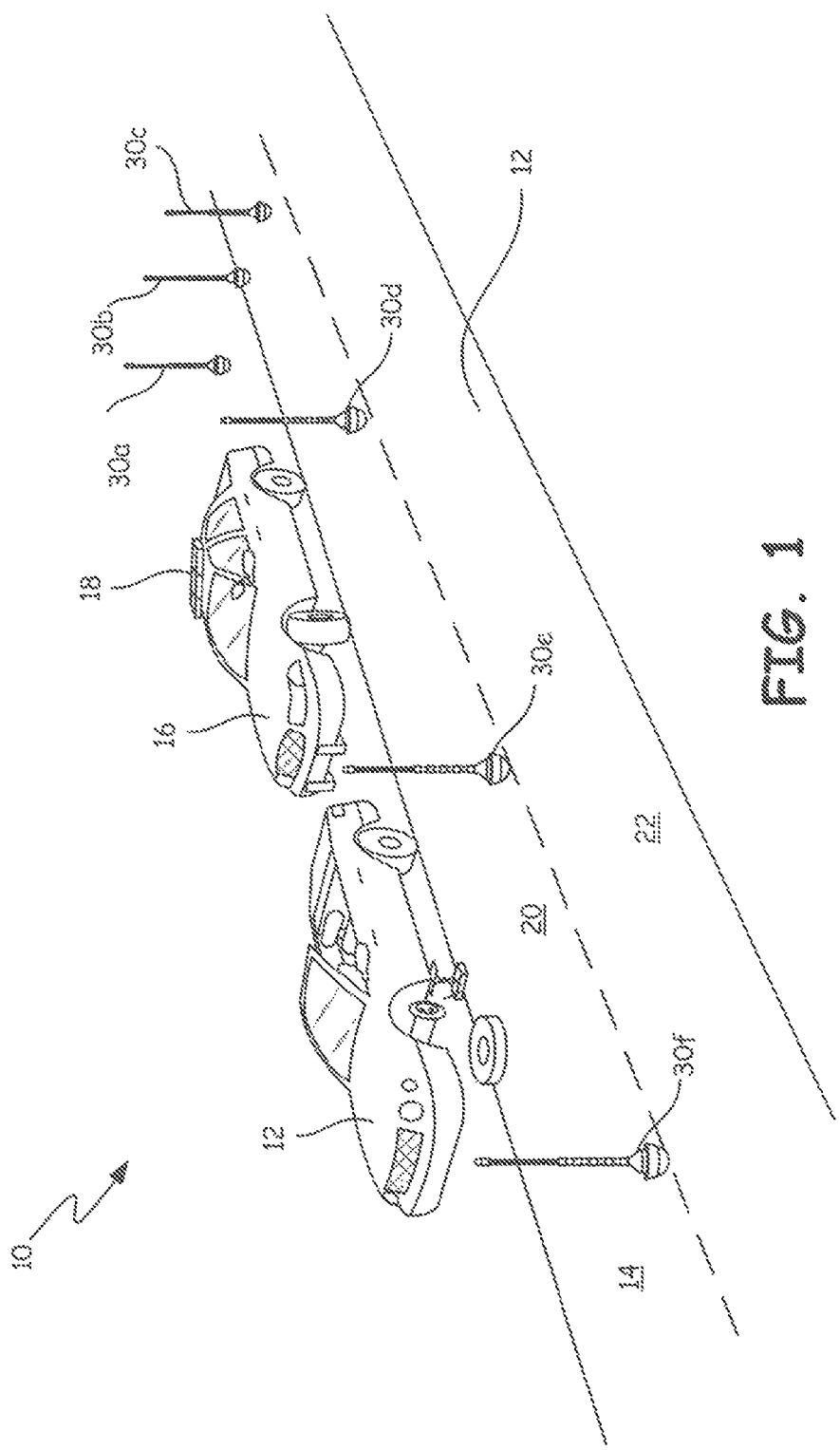
FIG. 1 is an illustration of an accident scene beside a roadway with the emergency safety marker system of the present invention deployed.

An electronic lighted safety marker system used by emergency responders to warn motorists of the presence of an accident scene ahead on or beside the roadway is provided by the invention. Such markers can be deployed individually or in groups by the emergency responder along the perimeter of the accident scene and ideally ahead of it along the roadway to provide adequate warning to approaching motorists to avoid the accident scene. The markers contain a power source, a light panel, a protective shield for the light panel, and electronic circuitry for controlling the operation of the lights in a predetermined frequency or pattern. One or more of the lights may be colored or operate in a strobe pattern for enhanced visibility for the motorists. The markers can also contain: a self-righting base that causes the marker to automatically return to its vertical position after it has been dropped by an emergency responder onto the ground or knocked or blown over after deployment; a low-impact sensor switch operatively connected to the electronic circuitry to automatically extend the light panel from its retracted, standby position to its extended, actuated position to its optimal height and turn on the lights when the marker device strikes the ground or other hard surface; a high-impact sensor switch that detects when a reckless motorist directly approaching the accident scene hits the marker, and provides an audible warning sound or message to the emergency responder of the potential incoming danger, a GPS transmitter for sending a signal regarding the location of the marker to a central dispatch department, so that the dispatcher can quickly send emergency help to an emergency responder who is injured by an incoming motorist at the accident scene; and a transmitter for constantly sending out a feedback radar signal triggered by the deployment of the device itself that can be received by vehicles equipped with on-board radar capabilities to warn the driver of an oncoming vehicle to slow down or move to another lane to avoid the accident scene before a crash occurs. When deployed at an accident scene, this safety marker provides a highly visible warning to oncoming motorists to slow down or switch lanes to avoid a crash with the vehicle at the accident scene, while also allowing the emergency responder to deploy the safety marker without jeopardizing his physical safety, and warn him of incoming reckless drivers that might cause further injury to him. The safety marker device may be capable of standing on its own at the accident scene, or constitute a hand-held device with a capability for mounting it to the top of a traffic cone for use at an accident scene. The safety marker may also be equipped with a gunshot sensor that detects the occurrence of a potential gunshot, transmitting a warning message to the central dispatcher along with the GPS location coordinates for the deployed safety marker and the potentially shot emergency responder.

In the context of the present application, "roadway" means a highway, freeway, road, street, rural or county route, or other paved or unpaved surface public way used by motor vehicles.

For purposes of the present invention, "emergency responder" means a person whose job is to respond to a stopped motor vehicle or vehicles along a roadway and attend to their safety needs, such as a policeman, state trooper, sheriff, deputy sheriff, ambulance, paramedic, fireman, or tow truck operator. Emergency responders also include non-official personnel like utility equipment repairmen, road construction crews, and road maintenance crews.

For purposes of this application, "accident scene" means a motor vehicle or motor vehicles on or adjacent to a roadway that have been stopped because of an accident or crash, flat tire, engine stall or disabled condition, medical emergency suffered by a driver or passenger in the motor vehicle, or other problem or emergency experienced by a vehicle or persons inside such vehicle.

The safety marker system 10 of the present invention is shown in FIG. 1. A passenger car 12 stopped by the side of roadway 14 with a flat tire is attended to by police car 16.

Police car 16 has a flasher 18 on its top, which is used by the policeman to visually warn approaching motorists to slow down and ideally move from the right-hand lane 20 to the safer left-hand lane 22 for passing the stopped passenger car and police car and their occupants. For purposes of this invention, passenger car 14 could be stopped along the roadway for any of a number of other possible reasons, including a stalled or disabled engine or its components, empty gas tank, accident with another car or truck, stoppage by the police car for violation of a law, medical emergency, or another reason for needing assistance. The point is that passenger car 14 and police car 16 attending to the passenger car and its occupants are stationary on or beside roadway 12, and therefore represent a potential hazard to approaching motorists who are passing at high speeds, particularly to approaching drivers who are tired, distracted, or inattentive. For purposes of this invention, any of these scenarios involving a stopped car on or beside a roadway is considered to be an "accident scene".

A plurality of safety markers 30 of the present invention have been positioned by the policeman on the roadway 14 around the accident scene to provide an additional visual warning to approaching motorists. The safety markers 30a, 30b, 30c, 30d, 30e, and 30f are positioned along roadway 14 in a conventional manner with markers 30b, 30c, and 30d positioned to gradually block incoming traffic from right-hand lane 20, and divert it to left-hand lane 22. Safety markers 30e and 30f are position on roadway 12 to cause approaching motorists to continue to drive in left-hand lane 22, so that right-hand lane 30 is free of traffic to provide a buffer between the passenger car 14 and police car 16 and their occupants from the passing traffic. This buffer provides additional safety to the policeman who may need to walk along the roadway 12 and the accident scene to attend to the occupants of passenger car 12, clear vehicular debris from the roadway, or investigate and gather evidence at the accident scene. As a further safety measure, safety mark 30a is positioned beside roadway 12 physically behind police car 16, so that it will be struck by a tired, inattentive, or impaired approaching motorist before that motorist can crash into the police car. This ability to detect a physical incursion by an approaching motorist into the buffer space set up by the safety markers 30a, 30b, 30c, 30d, 30e, and 30f around the accident scene represents an important feature of the safety marker system 10 of the present invention.

Figure 2:
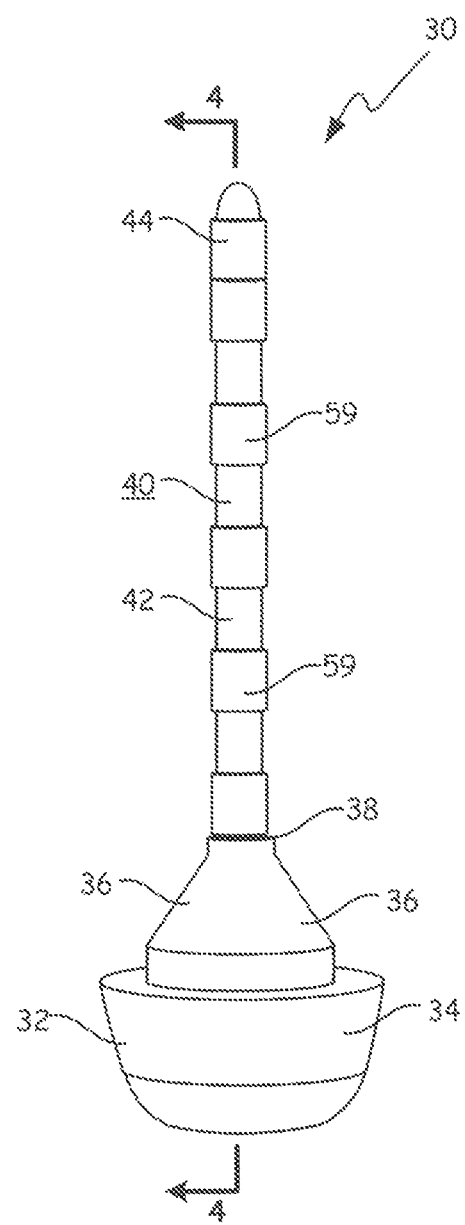
FIG. 2 is a perspective view of the safety marker in its retracted, standby state.

Safety marker 30 is shown in its retracted, standby position in FIG. 2. It compromises a base 32 having a lower housing 34 and an upper housing 36. Upper housing 36 has a inlet hole 38 along its top surface for receipt of light array assembly 40.

Light array assembly 40 comprises a stanchion tube 42 that is fixed in a vertical orientation to upper housing 36 of the base 32 via inlet hole 38. Positioned inside the interior region of a stanchion tube 42 is a light array wand 44 for linear movement between its retracted, standby position (FIG. 2) and its telescopically extended, actuated position shown in FIG. 8, as described more fully below (with only its top-most portion shown in FIG. 2).

Figure 3:
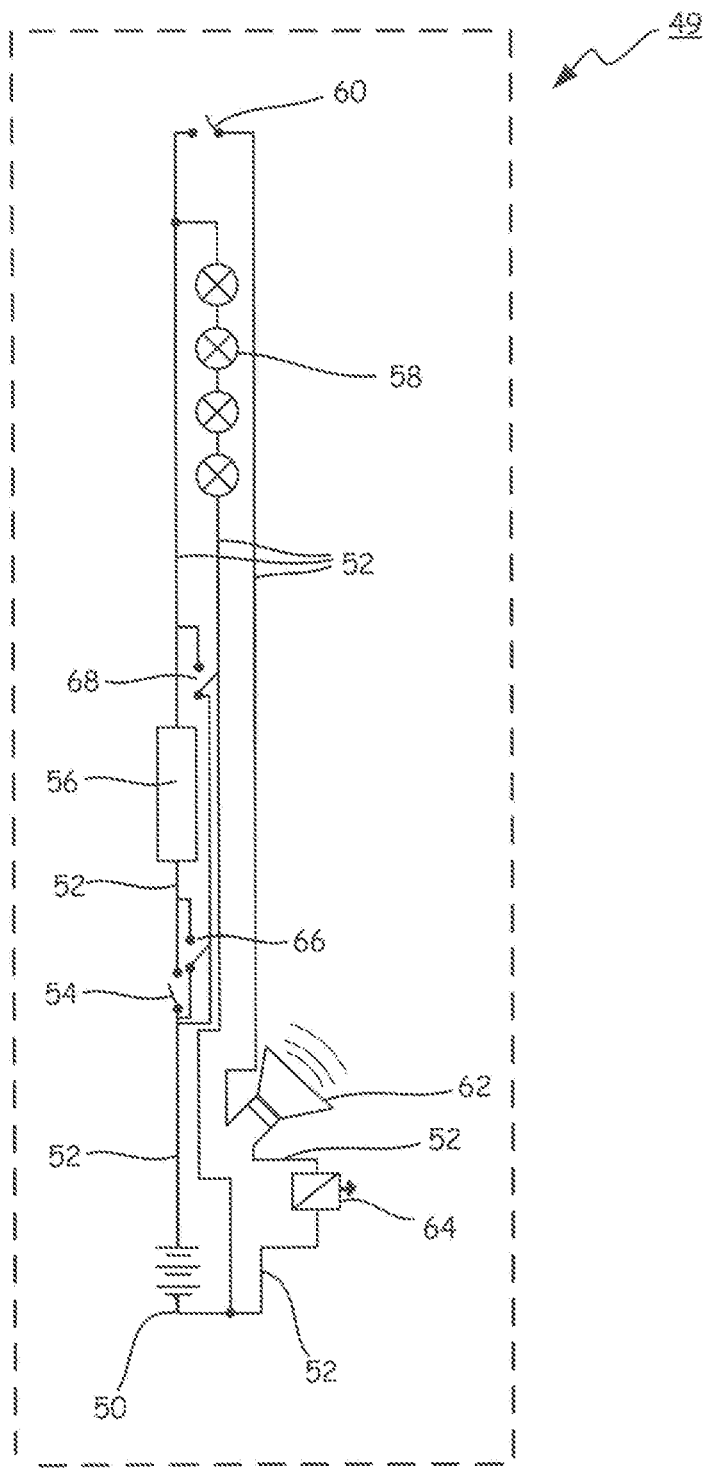
FIG. 3 is a schematic view of an electrical circuit for the safety marker.

The functional components of the safety marker 30 are depicted in the electrical circuit diagram 49 shown in FIG. 3. A source of electricity like a battery 50 provides electrical current 52 in circuitry 52 to a sensor activation switch 54. This switch is activated when the base 32 of safety marker 30 strikes the ground or other hard surface, such as when the safety marker is dropped from a position above ground. Actuation of the sensor switch 54 will close it to allow current 52 to flow to mechanism 56 for extending light array wand 44 vertically from stanchion tube 42 of the safety marker, as well as to turn on the plurality of light bulbs 58 contained in light array wand 44. When vertically extended and lighted, actuated safety marker 30 provides a visual warning to oncoming motorists of an accident scene ahead that is on or beside the roadway 14.

Current 52 in safety marker 30 will also flow through the circuit to opened sensor switch 60. This sensor switch 60 is located inside light array wand 44, preferably near its upper end. If an oncoming motorist who is tired, distracted, or reckless strikes the deployed safety marker 30 with his vehicle, the impact will actuate sensor switch 60 to close it, thereby allowing electrical current 52 to flow to screamer mechanism 62. This screamer mechanism 62 comprises a sound module for producing an audible warning sound or message to alert the policemen or other emergency responder at the accident scene of the potential danger posed to his personal safety by the rapidly approaching motorist.

Finally, electrical current 52 flows to location detector and transmitter 64. This is preferably a GPS transponder that applies triangulation from multiple cellular towers to determine the physical location of the safety marker 30, and automatically transmit the location coordinates to another party, such as a police station central dispatcher, who can then contact the policemen or other emergency responder at the accident scene to determine whether that person has been struck or injured by the oncoming motorist, and send emergency assistance where required. By receiving the GPS location coordinates transmitted by the safety marker 30, the central dispatcher can send the emergency assistance to the correct accident scene with confidence. Because of its circuitry 49, the location detector and transmitter 64 is only activated if the screamer mechanism is activated by the sensor switch 60. At the same time, it is only powered if the safety marker 30 is deployed by the emergency responder to extend the light array wand 44 and turn on the lights 58 by closing sensor switch 54 when the base of the safety marker strikes the ground or other hard surface.

Figure 4:
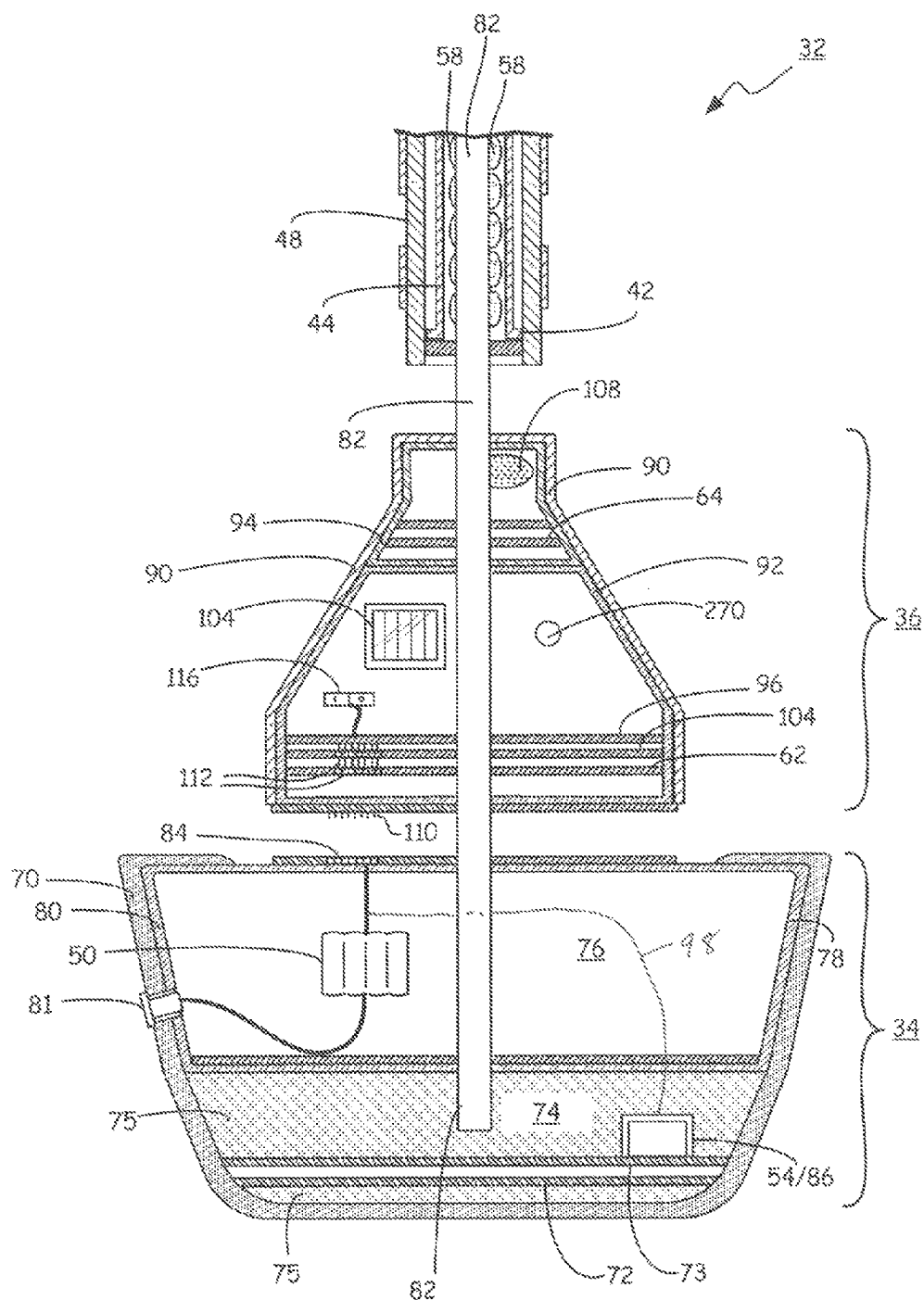
FIG. 4 is a partial, exploded, cut-away view of the safety marker of FIG. 2 showing its internal components.

The base 32 of safety marker 30 is shown in greater detail in FIG. 4. Lower housing 34 comprises a housing 70 having a partition wall 71 that divides it into lower chamber 74 and upper chamber 76. Lower chamber 74 is filled with a plurality of weighted pellets 75 such as lead shot or plastic polymer pellets that provides a "self-righting" feature to the safety marker 30 by lowering its center of gravity, as discussed more fully below. The lower housing 34 is preferably bowl-shaped with a rounded bottom, so that if the safety marker falls or is tipped onto its side, the weighted pellets contained inside lower chamber 74 will cause the safety marker to automatically roll along its rounded bottom surface to a vertical upright position. But lower housing 34 could have a shape other than a bowl-like shape, such as a triangular, cylindrical, or square prism as long as any bottom edges are rounded to permit the safety marker to roll to its upright position.

Fitted imide upper chamber 76 is battery bay 78 contained within housing 80. A plurality of batteries 50 are positioned inside this battery bay, such as in a circular arrangement around stabilization rod 82. These batteries are wired together and connected to contact strip 84 located on the top exterior surface of lower housing 34 to provide a source of electrical current to the safety marker 30, including to its light bulbs 58 in the light array wand 44. The batteries could be alternatively deployed inside upper housing 76 in a linear or stacked arrangement. The batteries may be replaceable.

Alternatively, they may be rechargeable with a plug 81 provided in the sidewall 80 of lower base housing 34 for a power cord. By positioning the batteries 50 in upper chamber 76 of base 32, they are protected from moisture and other adverse weather elements.

Alternatively, batteries 50 can be positioned inside lower chamber 74 to further lower the center of mass of the safety marker 30 to enable its self-righting feature. A smaller amount of weighted pellets 75 may be required inside lower chamber 74 due to the weight contributed by the batteries 50, or the weighted pellets may be eliminated entirely.

The electrical power requirement for safety marker 30 will depend upon the number and nature of the electrical components that need to be energized, and the desired duration of deployment, particularly in the dark when the on-board solar panel 104 cannot provide supplemental electrical power. The total battery capacity should be 5-50V, preferably 10-30V so that the safety marker may be deployed at the accident scene for at least four hours without running out of its electrical charge.

Instead of a solid plastic material, housing 70 may constitute a protective boot 70 made from a high-impact resistant, but elastomeric material like natural or synthetic rubber or a polymer material like silicone, acrylonitrile butadiene ("ABS"), or high-impact polystyrene. Such material has a pliable characteristic that becomes deformed when the base 32 of the safety marker 30 strikes the ground or other hard surface. The protective boot 70 also protects the components contained inside the lower housing 34 from rain, snow, dirt, rocks, grime, or other elements.

Also positioned inside lower chamber 74 of lower housing 34 is low-impact sensor switch 86 that provides the functionality of sensor switch 54 shown in FIG. 3. This low-impact sensor switch 86 should be positioned relatively close to the bottom of the safety marker and will be discussed more fully below.

Upper housing 36 is shown in greater detail in FIG. 4. It comprises a protective housing 90 made from a high impact-resistant plastic polymer like polystyrene, polyethylene, nylon, or other suitable material that provides stability to the components contained inside upper housing, protection from the weather elements, and protection from impact if the safety marker should fall onto the ground or its side.

Contained inside this housing 90 are electronics bay 92 and GPS bay 94. Electronics bay 92 in turn contains a plurality of circuit boards 96 that provide the necessary electronic circuitry for the operation of safety marker 30. This includes the circuitry 98 connected to the low-impact sensor switch 86 that in turn is located in the battery bay 78; the screamer module 100 and its circuitry connected to the high-impact sensor switch 102 that in turn is located near the top of the light array wand 44; and early-warning radar transponder 104 and its circuitry that transmits a warning signal to on-board radar signal receivers that that are increasingly available in automobiles as a safety feature. Such on-board receivers will receive and communicate to the oncoming driver a transmitted warning signal or message for the accident scene ahead along the roadway to enhance the chances of the driver slowing down his speed or switching to the left-hand lane in order to exercise caution when passing the accident scene. These features of the safety marker 30 will be described more fully below.

Mounted to the exterior of the housing 90 is a small solar panel 106 that captures sunlight and converts it into on-board photovoltaic power for the safety marker. Circuitry contained inside the electronics bay 92 provides this photovoltaic power as electric current to the circuit boards 96 and electronic components contained inside the safety marker to extend the battery life of the safety marker.

GPS bay 94 contains GPS location detector and transmitter 64 described more fully below for producing location coordinates for the safety marker. This data is transmitted to a central dispatcher as described above for providing an accurate location of the accident scene in case backup assistance needs to be sent to the emergency responders at the accident scene.

Screamer speaker 108 is mounted to the exterior of housing 90 adjacent to the GPS bay. This speaker is connected via its electrical circuit to screamer module 62 to emit the emergency warning sound or message if an oncoming motorist strikes the safety marker 30 near the accident scene and actuates high-impact sensor witch 60. This warning sound or message enables the emergency responder at the accident scene to jump to a safe location to avoid physical injury.

GPS bay 94 and electronics bay 92 are stacked one on top of the other inside upper housing 90. Contacts strip 110 located along the bottom surface of the upper housing engages contacts strip 84 located along the top surface of the lower housing 80 so that when the upper housing is operatively connected to the lower housing, a unified electrical circuit is produced containing battery 50, circuit boards 96, low-impact sensor switch 86, high-impact sensor switch 60, screamer module 62, location detector and transmitter 64, radar warning transmitter 104, and lights 58. A plurality of contact strips 112 mounted to the plurality of circuit boards 96 connects them to each other electrically. Finally, stabilization rod 82 passes through upper housing 90 and lower housing 80 and the GPS bay 94, electronics bay 92, and battery bay 78 contained therein to provide proper orientation of the components and lateral stability around the vertical axis provided by the stabilization rod 82. Stabilization rod 82 is securely connected to partition wall 71 in lower base housing 34 to hold all of the components together.

Figure 5:
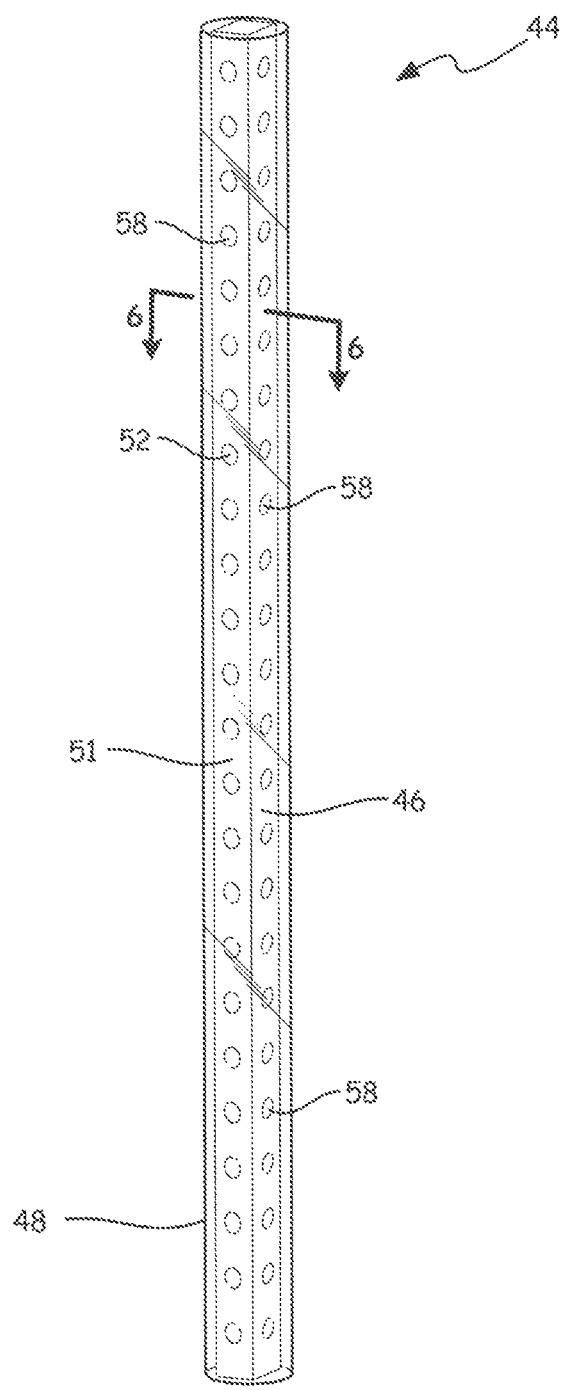
FIG. 5 is a perspective view of the light array wand for the safety marker.
Figure 6:
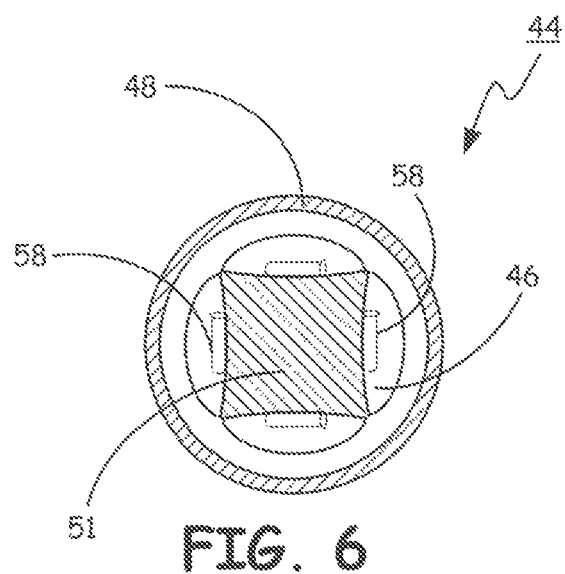
FIG. 6 is a plan view of the light array wand of FIG. 5.
Figure 7:
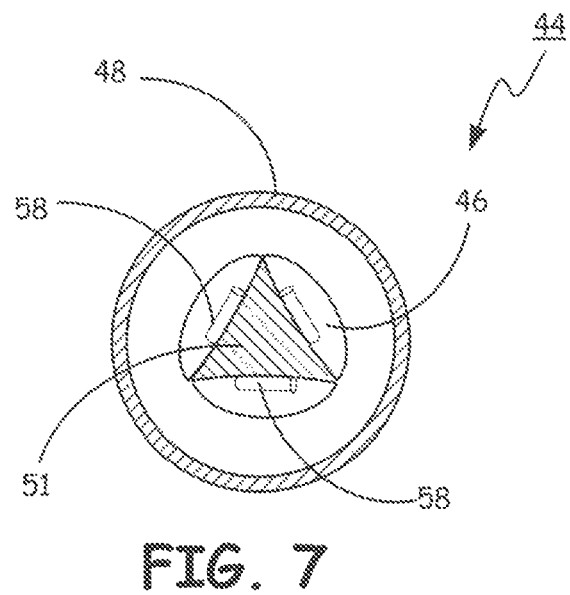
FIG. 7 is a plan view of an alternative embodiment of the light array wand for the safety marker.

Light array wand 44 is shown more fully in FIGS. 5-7. It comprises light array panel 46 contained inside transparent carrier tube 48. Light array panel 46 comprises a core substrate 50, which can adopt any suitable shape such as a cylinder, a square prism (see FIG. 6), or a triangular prism (see FIG. 7). It preferably is three-dimensional for providing multiple surfaces for lights that are visible in 360°. Carrier tube 48 is preferably cylindrical with a circular cross section since such a shape will accommodate a square prism, triangular prism, or cylindrical core substitute 50. But, carrier tube 48 may adopt any other shape such as a square, triangular, or rectangular cross section that is capable of containing the shape of core substrate 50, and protecting it from the weather elements (i.e., rain, snow, sunshine, heat).

Positioned along the exterior surface of core substrate 50 is a plurality of light bulbs 52. These light bulbs 52 may compromise incandescent, LED, CFL, fluorescent lamps, or any other suitable emitter of light. The light bulbs 52 may be positioned in one or more columns along each exterior face of the core substrate 50. They may also be positioned in a single row or multiple rows along the exterior faces of the core substrate 50. Preferably, the light bulbs 52 are positioned sufficiently around the perimeter of core substitute 50 to enable the core substrate to emit light in an arc of 90-360°, preferably 150-360°, even more preferably 360°. In this manner, an approaching motorist will see the warning light emitted by the light bulbs 52 positioned along core substrate 50 regardless of the specific orientation of the safety marker 30 positioned along roadway 12 with respect to the angle of the approaching motorist. Light output is measured primarily in lumens. A single LED bulb can produce from 2 to 200 lumens in light output depending upon how it is driven. Adding more individual LED bulbs will increase the lumen output. The light bulbs 58 contained in the light array wand should produce approximately 2 to 20,000 lumens of light output.

Carrier tube 48 should be made from a material that is transparent or semi-transparent and durable. The light 52 must readily shine through this carrier tube for optimal visibility. At the same time, the carrier tube 48 should be sufficiently impact-resistant to protect the components contained inside it if the safety marker 30 should be struck by an oncoming vehicle, or otherwise knocked onto the ground. Acrylic, polycarbonate, or clear ABS plastics are a good choices. But any other plastic polymer or other material exhibiting these characteristics may be used.

The light bulbs 58 contained in the light array wand 44 may be colored for added visibility to the approaching motorist. For example, the light bulbs may be red or blue, which are colors reserved for police and other law enforcement officials. Alternatively, the light array may be broken up into alternating segments of red and blue lamps. In another alterative embodiment, all the lamps in the light array may be white with the transparent carrier tube 48 instead colored red or blue or alternating red and blue segments.

Because the safety marker 30 of the present invention is also useful for non-law enforcement personnel, such as tow truck operators, road construction crews, or utility equipment repairmen, the light array may contain instead yellow light bulbs 58. Alternatively, it may contain white light bulbs shining through a yellow-colored transparent carrier tube 48. Yellow safety warning lights are widely associated by motorists with a construction or repair scene that requires motorists to slow their speed to pass or switch to a lane further away from the stopped vehicles to pass.

To add further visibility to the safety marker 30 of the present invention, the lights 58 contained in the extended light array panel 46 may blink on and off in a constant or timed cycle. A strobe light beacon 56 may also be positioned on top of the light array wand 44 to emit a pulsating white light.

To address reduced night-time visibility, one or more bands 59 of fluorescent color like orange, yellow, or green may be positioned along the circumference of stanchion tube 42. The bands will be reflected by the headlights of approaching motorists. They may be provided to the stanchion tube by means of paint or reflective tape.

In order to further help approaching motorists to notice the presence of the safety marker 30 along the roadway 12, an array of lights, such as LED strobe bulbs 60, may be positioned around the perimeter of the base 32. The pulsating lights, especially if colored, will be noticeable from a distance.

A day/night switch 117 may be mounted to the base housing 90. LED bulbs 58 in particular need to be bright enough during daylight hours to be seen by oncoming motorists. But, their high lumen intensity often makes them too bright during nighttime hours. Thus, this switch 117 may be integrated with the circuitry for the lights 58 to either turn off some of the light bulbs during nighttime deployment hours, turn on and off separate sets of light bulbs having different wattages for daylight versus nighttime hours (higher wattages for daylight, lower wattages for nighttime), or act to reduce the voltage directed to the light bulbs to dim their lumen intensity.

While the visibility to approaching motorists of the safety marker 30 and the usage of a possibility of such marker in the safety marker system 10 is an important feature of the present invention, even more important is the ability of emergency responders to safely deploy the markers 30 along the roadway 12 around the accident scene without subjecting themselves to injury or death by inattentive, impaired, incapacitated, or reckless approaching motorists. Therefore, the safety marker 30 should be preferably be capable of being dropped by the emergency responder onto the pavement and automatically actuated to its extended, lighted status without the emergency responder having to get out of his vehicle.

Figure 8:
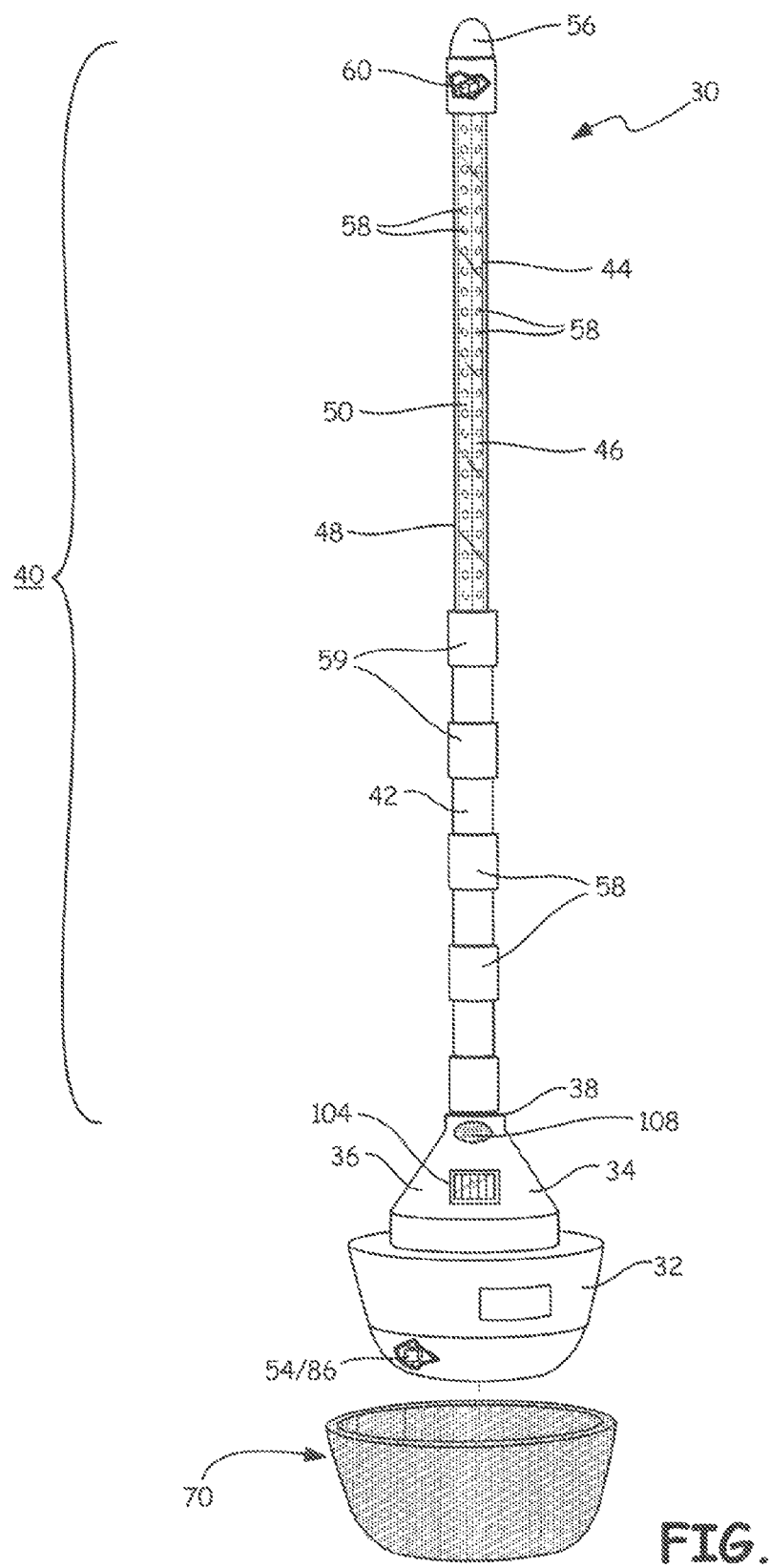
FIG. 8 is a perspective view of the safety marker of FIG. 2 in its extended, actuated state.

FIG. 8 shows the safety marker 30 of the present invention in its extended, activated state. The light array wand 44 is extended vertically from the stanchion tube 42. This causes the plurality of light bulbs 58 on core substrate 50 to shine through transparent carrier tube 48 at a higher elevation that is more noticeable to an approaching motorist. Instead of having to look for a conventional safety marker like a flare or low-profile LED lamp that is short and therefore closer to the pavement of roadway 14, the lights 58 of the safety marker 30 of the present invention are positioned along the upper region of an extended safety marker that is approximately 2.5 to 3 feet tall from the ground. This is closer to the line of sight of the approaching motorist.

The inlet hole 38 in the top of the upper base housing 36 accommodates the light array wand assembly 40 of the safety marker 30. The inside diameter of this inlet hole should be approximately the same size as the outside diameter of stanchion tube 42. In this manner, the lower end of stanchion tube 42 may be securely held in place by inlet hole 38, as further laterally supported by stabilization rod 82 that extends vertically from the lower base housing 34 and upper base housing 36 into the core substrate 46 of the light array wand 44. Stanchion tube 42 will define the vertical axis A-A, and provide support to light array wand 40, which travels inside the stanchion tube between its standby position and extended position along the vertical axis A-A.

The triggering mechanism for the automatic extension of the light array wand 44 and actuation of the lights 58 contained inside the safety marker 30 is low-impact sensor switch 54/86 located inside lower chamber 74 in lower base housing 34. It comprises a disturbance sensitivity switch, shock switch, inertia switch, contact switch, or tilt switch, such as the ones available from Select Controls, Inc. of Bohemia, N.Y. This low-impact sensor switch 90 is designed to detect instances of sudden impact or severe vibration when the base 32 or side of the safety marker 30 hits the ground or other hard surface. Similar to airbag deployment sensors or car alarm sensors used in vehicles, this shock/impact sensor outputs a value that represents the severity of the impact or severe vibration experienced by the safety marker, and compares this value against a preprogrammed threshold value approximating the impact when the safety marker is dropped from a height of about 2.5 feet from the ground or other hard surface. The switch should preferably be positioned inside the lower chamber 74 of the lower base housing 32 adjacent to the bottom or side wall. When the marker base hits the ground or other hard surface, the slightly pliable material of the bottom or side wall gives way to enable the impact to activate the switch.

Shock sensors share technology types with accelerometers and vibration sensors. Shock may be measured using piezoelectric or piezoresistive means, as well as strain gages.

Piezoelectric sensors represent one of the most widely used sensor types for shock measurements due to their inherent ruggedness and adaptability. This type of sensor relies upon a piezoelectric material like a quartz crystal or polycrystalline ceramic material to sense changes in force. The piezoelectric effect refers to the accumulation of an electrical charge in the material due to mechanical stress. Piezoelectric shock sensors use some type of piezoelectric material in close proximity to a solid mass. When forces are applied to the device, the material responds to the compression or strain provided by the mass. Due to Newton's Second Law of Motion (F=m·a), the change in electric charge within the material is equal to the force acting against it, thereby allowing the sensor to effectively measure the shock imposed upon the dropped safety marker when it hits the ground.

Piezoresistive sensors are similar to piezoelectric sensors, except that their output is measured at a change in resistance, instead of electric charge. They are typically manufactured as semiconductors with separate resistive circuits for each axis to be measured. Each axis includes multiple piezoresistors that decrease their resistive value when force is applied. Piezoresistive accelerometers intended for shock and impact measurement are usually designed to include semiconductor strain gages for stability. This type of sensor is typically selected for applications that require the measurement of steady, long-duration shocks.

If the force of impact or shock measured by low-impact sensor switch 54/86 when the dropped safety mark 30 hits the ground or other hard surface meets or exceeds the preprogrammed volume for a 2.5-3.0 foot drop, the sensor will close switch 54 (see FIG. 3) to send electrical current 52 to light array wand extension and light actuation mechanism 56 to extend the light array wand 44 vertically from its contracted, standby position inside stanchion tube 40 (see FIG. 2) to its extended position shown in FIG. 8.

Figure 9:
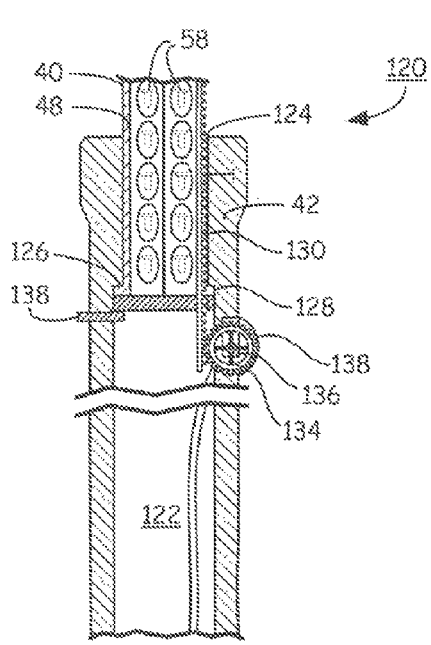
FIG. 9 is a cut-away view of the cog and gear strip assembly embodiment for actuating the extension of the safety marker.

There are several different embodiments available under the safety marker 30 of the present invention for this mechanism 56 for extending the light array wand 44, as shown in FIG. 8. For example, FIG. 9 shows a cog and gear strip assembly 120. The light array wand assembly 40 surrounded by carrier tube 48 moves vertically within stanchion tube 42, defining chamber 122 within the stanchion tube 42 below the light array wand assembly. An annular region 124 is formed between stanchion tube 42 and carrier tube 48. Formed around the bottom circumference of carrier tube 48 is lip 126 which abuts shoulders 128 formed within the interior surface of stanchion tube 42 when the light array wand assembly 40 is vertically extended. Secured vertically along the exterior surface of carrier tube 48 is gear strip 130 which comprises a solid substrate having a plurality of apertures 132 formed therein in a vertical array. Mounted to stanchion tube 42 and extending partially into the annular region 124 is drive gear 134. A servo motor 136 (not shown) turns this drive gear along an axis extending from the servo motor. Teeth 138 formed around the perimeter of the drive gear engages the apertures 132 within gear strip 130.

When actuated, the low-impact sensor switch 54/86 closes its switch to send electrical current to servo motor 136 to cause it to start to rotate drive gear 134. The rotating teeth 138 engaging the plurality of apertures 132 in gear strip along carrier tube 48 causes the light array wand assembly 40 to move vertically within stanchion tube 42 until perimeter lip 126 carrier tube 48 abuts the shoulders 128 formed within stanchion tube 42 to halt the upward movement of the light array wand assembly 40. At this point the light array wand assembly of the safety marker is in its fully extended configuration. Spring-loaded release pin 138 extending partially into chamber 122 engages the bottom surface of lip 126 of the carrier tube to support the light array wand assembly in its fully extended position. Meanwhile, female contacts embedded within the sidewall of carrier tube 48 make electrical contact with male contacts positioned along the sidewall of stanchion tube 42 to complete the electrical circuit for delivering current to lights 52 contained inside light wand 44.

When the emergency responder wishes to return the light array wand to its standby position after the accident scene is cleared, he simply disengages the release pin 138 to allow the light array wand to be manually pushed down into the stanchion tube 42. The clutch in the servo motor 136 has disengaged when the light wand has reached its extended position. Thus, it provides no resistance to the drive gear 134 which rotates freely as the light array wand is pushed down to its retracted, standby position.

Figure 10:
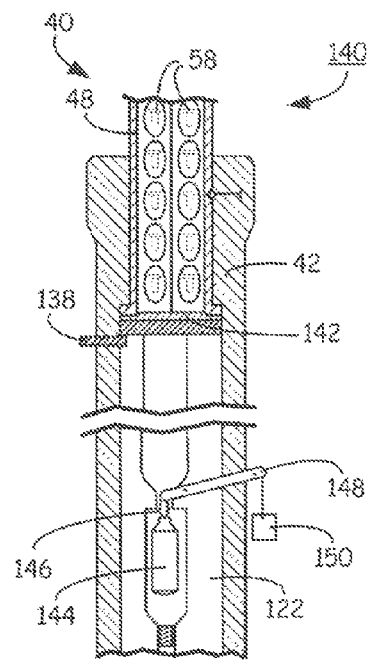
FIG. 10 is a cut-away view of the gas propellant assembly embodiment for actuating the extension of the safety marker.

Alternatively, the actuator mechanism 54 may compromise the gas propellant embodiment shown in FIG. 10. The structure of the stanchion tube 42 and carrier tube 48 are similar to the FIG. 9 embodiment except that a cup seal 142 extends along the bottom surface of the carrier tube 48 to seal the light array wand assembly 40 from chamber 122 formed inside stanchion tube 42. A small cylinder 144 filled with a compressed gas like carbon dioxide is located inside chamber 122. Firing pin 146 extends inside the throat 148 of the cylinder to serve as a valve for closing the cylinder to prevent the compressed gas from escaping. Linkage 148 is connected in a pivotable relationship at its one end to the top of the firing pin 146, and at its other end in a pivotable relationship to solenoid actuator 150.

When actuated, the low-impact sensor switch 54,86 closes its switch to send electrical current to solenoid actuator 150. This solenoid actuator in turn causes the end of linkage 140 to which it is connected to be lowered, raising in the process the other end of the linkage to pull firing pin 146 out of the throat of the gas cylinder 144 to open the valve. This allows the compressed gas contained inside the cylinder to escape inside chamber 122. This gas escapes in a short, quick burst because the solenoid actuator 150 quickly acts to raise its end of the linkage 148 to lower the other end and cause the firing pin to close the cylinder once again. The released burst of compressed gas pushes against the cup seal 142 to raise the light array wand inside stanchion tube 42 until it reaches its fully extended position when lips 126 of the carrier tube abut shoulders 128 in stanchion tube. Release pin 138 supports the light array wand in its vertically extended position. Mating female and male contacts complete the electrical circuit to deliver electric current to lights 52 inside the light array wand, as before.

A pressure relief valve 152 inside the stanchion tube 42 enables the emergency responder to evacuate the escaped compressed gas from chamber 122 so he can manually push the light array wand 44 back to its retracted, standby position when the accident scene is cleared.

Figure 11:
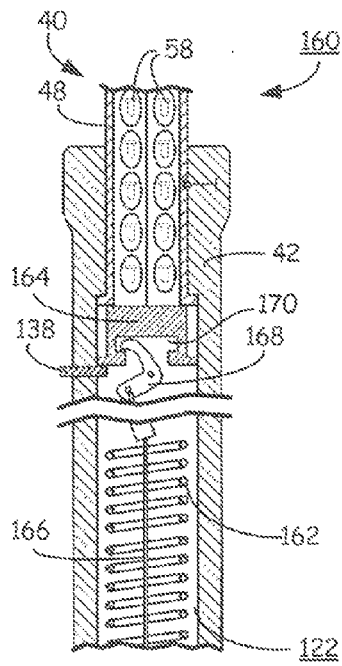
FIG. 11 is a cut-way view of the spring assembly embodiment for actuating the extension of the safety marker.

A spring embodiment 160 for the actor mechanism 54 is shown in FIG. 11. The structure of the stanchion tube 42 and carrier tube 48 are similar to the FIG. 9 embodiment. A compression spring 162 is disposed inside chamber 122 between the bottom wall of stanchion tube 42 and retaining member 164 disposed below the bottom surface of the carrier tube 48 containing the light array wand 44. An electronic solenoid operates actuator arm 166 connected to book 168 which engages recess 170 formed in the bottom surface of retaining member 164.

When actuated, the low-impact sensor switch 54/86 closes its switch to send electrical current to the solenoid actuator 100. This solenoid actuator in turn causes the actuator arm 166 to move to disengage hook 168 from recess 170 in the retaining member 164. This allows the compression spring 162 to expand to its fully length, using its stored energy to push against the bottom surface of the light array wand to raise it inside stanchion tube 42 to its extended position when lips 126 of the carrier tube abut shoulders 128 in stanchion tube. Release pin 138 supports the light array wand in its vertically extended position. Mating female and male contacts complete the electrical circuit to deliver electric current to lights 52 inside the light array wand, as before.

The emergency responder can push the light array wand down to its retracted, standby position after the accident scene is cleared, compressing spring 162 in the process. Hook 168 will engage the spring once again to retain it in its compressed state.

Figure 12:
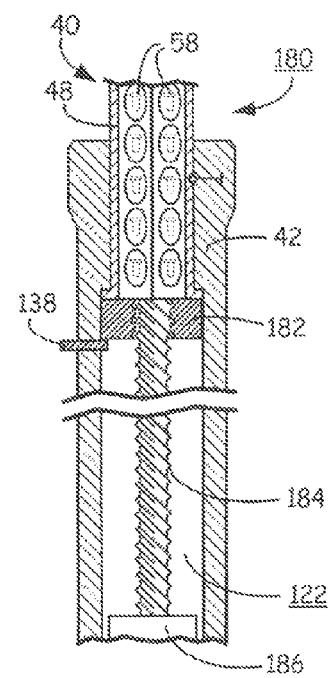
FIG. 12 is a cut-away view of the jack screw assembly embodiment for actuating the extension of the safety marker.

A jack screw embodiment 180 for the actuator mechanism 54 is shown in FIG. 12. The structure of the stanchion tube 42 and carrier tube 48 are similar to the FIG. 9 embodiment. A base support 182 is mounted to the bottom surface of the carrier tube 48 of the light array wand 44. A threaded column 184 contained inside chamber 122 is attached at its upper end to the base support 182. The bottom end of the threaded column 184 is operably secured to a motor 186 also contained inside chamber 122.

When actuated, the low-impact sensor switch 54/86 closes its switch to send electrical current to motor 186. The energized motor rotates threaded column 184 to raise base support 182 and with it the light array wand inside stanchion tube 42 to its extended position when lips 126 of the carrier tube abut shoulders 128 in stanchion tube. Release pin 138 supports the light array wand in its vertically extended position. Mating female and male contacts complete the electrical circuit to deliver electric current to lights 52 inside the light array wand, as before.

When the emergency responder wishes to return the light array wand in the safety marker to its retracted, standby position after the accident scene is cleared, he causes the motor 186 to turn the threaded column 184 in the opposite direction.

The lower chamber 74 of the lower base housing 34 is filled with a plurality of weighted pellets, such as lead shot or plastic polymer pellets. These weighted pellets act to lower the center of gravity of the safety marker 30. In this manner, when the safety marker is dropped onto the roadway 14 or other hard surface, it will stand upright as the rounded, weighted bottom surface rolls along the roadway, even if it initially lands on its side or at an angle with respect to its vertical axis A-A. This self-righting feature enables the emergency responder to drop the safety marker 30 at the desired location around the accident scene perimeter with confidence that it will come to rest deployed along its vertical axis A-A. The emergency responder does not need to get out of his vehicle to manually deploy the safety marker in a vertical orientation, where he might subject himself to the danger of being struck by an approaching motorist.

A plurality of batteries 50 are positioned around stabilization rod 82 in upper chamber 74 of lower base housing 34. These batteries are wired together to provide the necessary electrical power source to the light bulbs 52 of the light array wand 44. The batteries may be replaceable. Alternatively, they may be rechargeable with a plug 81 provided in the sidewall 80 of lower base housing 34 for a power cord. By positioning the batteries 50 in upper chamber 76 of base 32, they are protected from moisture and other adverse weather elements. They alternatively may be placed inside lower chamber 74 to provide their collective weight to further lower the center of gravity of the safety marker 30 to enhance its self-righting capability and reduce the amount of weighted pellets required.

The sidewall 80 of battery bay 78 of base 32 is made from a suitable impact-resistant material like polystyrene plastic. This will help to absorb the impact of the dropped safety marker 30 by the ground or other hard surface to protect the unit, itself as well as the electronics contained inside the unit over a prolonged time period of usage.

Instead of low-impact sensor switch 54/86, the safety marker 30 may be equipped with two contact plates 72 and 73 positioned across lower chamber 74 inside lower base housing 34 (see FIG. 4). These contact plates are made from a flexible metal like copper or gold. The plates are positioned in the substantially parallel alignment with each other approximately 0.25-2.0 inches from the bottom surface of the boot 70 in base 32. The plates should be approximately 0.20-1.0 inches from each other and are connected to the electronic circuitry of the safety marker (see FIG. 3). When the safety marker 30 is dropped onto the ground, the impact causes deformation of the elastomeric material in boot 70 to deflect contact plate 72 against contact plate 73. The weighted pellets contained inside lower chamber 74 may also be pushed by the deformed bottom boot surface 70 to deflect contact plate 72 against contact plate 73. By the two contact plate's surfaces coming into contact with each other, the electrical circuit is completed to deliver electrical current 52 to actuation mechanism 56 for extending the light panel 44 and turning on lights 58 in the deployed safety marker. These contact plates may be used in lieu of the low-impact sensor switch 54/86, or as a backup to the sensor switch.

The safety marker 30 may also contain a manually-operated switch 116 located in the sidewall 90 of upper housing 36 (see FIG. 4). Contained inside electronics bay 92, this manual switch 116 enables the emergency responder to manually extend the light wand 44 and/or turn on lights 58.

As shown in FIG. 3, this switch 66 bypasses sensor switch 54 to deliver electrical current 52 to actuation device 56 for extending the light wand 44 and turning on lights 58. Alternatively, switch 68 bypasses both sensor switch 54 and actuation device 56 if the emergency responder only wishes to turn on lights 58 without extending light wand 44. This manual switch 116 constitutes a flush-mounted, sealed, and waterproofed switch set within the housing wall like a microwave switch.

Low-impact sensor switch 54/86 or manual on-off switch 116 may have a delay circuit built into it so that a predetermined delay period (e.g., 5-15 seconds) occurs after the switch is actuated before the associated functionality in the safety marker (i.e. light wand extension or turning on the lights) is in turn actuated. This delay feature enhances safety for the emergency responder so that he is not blinded by the lights suddenly being turned on, or have his eye accidently poked by the extended light wand. At the same time, the delay period should be short enough in duration so that the resulting actuation of the safety marker's functionality is rapid enough to ensure the emergency responder that the unit is working properly.

Another important feature of the safety marker 30 of the present invention for enhancing the safety and well-being of an emergency responder at an accident scene is its incursion detection system. A high-impact sensor switch 60 is preferably positioned inside the light array wand 44 near its upper end, as shown in FIG. 8. Any recklessly driven, oncoming vehicle is likely to strike the deployed safety marker with its light array wand extended roughly to the height of the front bumper or axle of most vehicles. In this manner, the high-impact sensor switch 60 will be proximate to the oncoming vehicle's bumper in order to enhance its actuation.

The high-impact sensor switch 60 comprises an inertia switch or a shock sensor switch, such as the ones available from Select Controls, Inc. of Bohemia, N.Y. The high-impact sensor switch 60 operates similarly to the low-impact sensor switch 54/86 described above. It measures the degree of impact created on the safety marker by an incoming motor vehicle driven by an inattentive, impaired, or reckless motorist hitting the safety marker, and may be adjusted for a predetermined triggering speed threshold. If the impact exceeds the equivalent of, e.g., twenty miles per hours, then the high-impact sensor switch 60 will actuate via a separate switch in the circuitry an on-board screamer device 62 which is connected to a speaker 108 mounted to the base of the safety marker 30. The screamer device 62 will emit via, e.g., a computer-actuated sound chip a loud wailing sound or audible warning message that can be heard by the emergency responder. By prepositioning the safety marker 30 a predetermined distance from the accident scene towards the oncoming traffic (e.g., 30 feet), sufficient time will be provided after an oncoming motorist' vehicle strikes the safety marker and the screamer device emits its wailing sound or warning message for the emergency responder to jump out of harm's way.

This early warning detection feature of the safety marker system of the present invention may be analogized to a baseball game. If a batter hits a pitched baseball travelling at 100 mph, the resulting hit ball also travelling at approximately 100 mph will travel the 60 feet to reach the pitcher in approximately 0.41 seconds. But it will not reach an outfielder standing 350 feet from home plate for 2.39 seconds. If the accident scene is analogized to being located in the outfield, and the safety marker is analogized to being located at home plate, then the emergency responder located at the accident scene will receive much more advanced warning provided by the deployed safety marker of the potential danger posed by the incoming vehicle than if he was standing on the pitcher's mound.

The safety marker 30 of the present invention will provide an alert in advance to the emergency responder at the safety marker for a variety of different combinations of incoming vehicle speed and distance traveled, as shown below in Table 1.

TABLE 1

| Incoming Vehicle Speed (mph) | Distance from Accident Scene (yards) | Warning Time (sec.) |
|---|---|---|
| 60 | 50 | 1.7 |
| 60 | 100 | 3.4 |
| 60 | 200 | 6.8 |
| 60 | ¼ mile | 15 |
| 45 | 50 | 2.3 |
| 45 | 100 | 4.5 |
| 45 | 200 | 9 |
| 45 | ¼ mile | 20 |

For example, if the incoming vehicle is approaching the accident scene at 60 mph and strikes a safety marker deployed 50 yards ahead of the accident scene, the emergency responder will receive approximately 1.7 seconds of advanced warning provided by the screamer in the safety marker before the vehicle actually reaches the accident scene. On the other hand, if the safety marker is deployed 200 yards ahead of the accident scene, the emergency responder will receive approximately 6.8 seconds of advanced warning for the same incoming vehicle travelling at 60 mph. If the safety marker is deployed instead one-quarter mile ahead of the accident scene, then the advanced warning provided to the emergency responder will increase to 15 seconds for the same incoming vehicle travelling at 60 mph. Thus, this early warning feature provided by the safety marker of the present invention may save the life of the emergency responder, or at least protect him from serious bodily injury.

As an additional safety measure, the emergency responder may be equipped with a small remote transponder containing a speaker worn on, e.g., the lapel of his uniform. The speaker may contain a radio frequency receiver in communication with a corresponding RF transmitter 280 connected to the screamer device 62 in the base of the safety marker. This will enable the wailing sound or audible warning message emitted by the screamer device 62 to be transmitted directly to the lapel remote speaker so that the emergency responder can more easily hear the warning above the traffic noise before the oncoming motorist strikes him.

Figure 13:
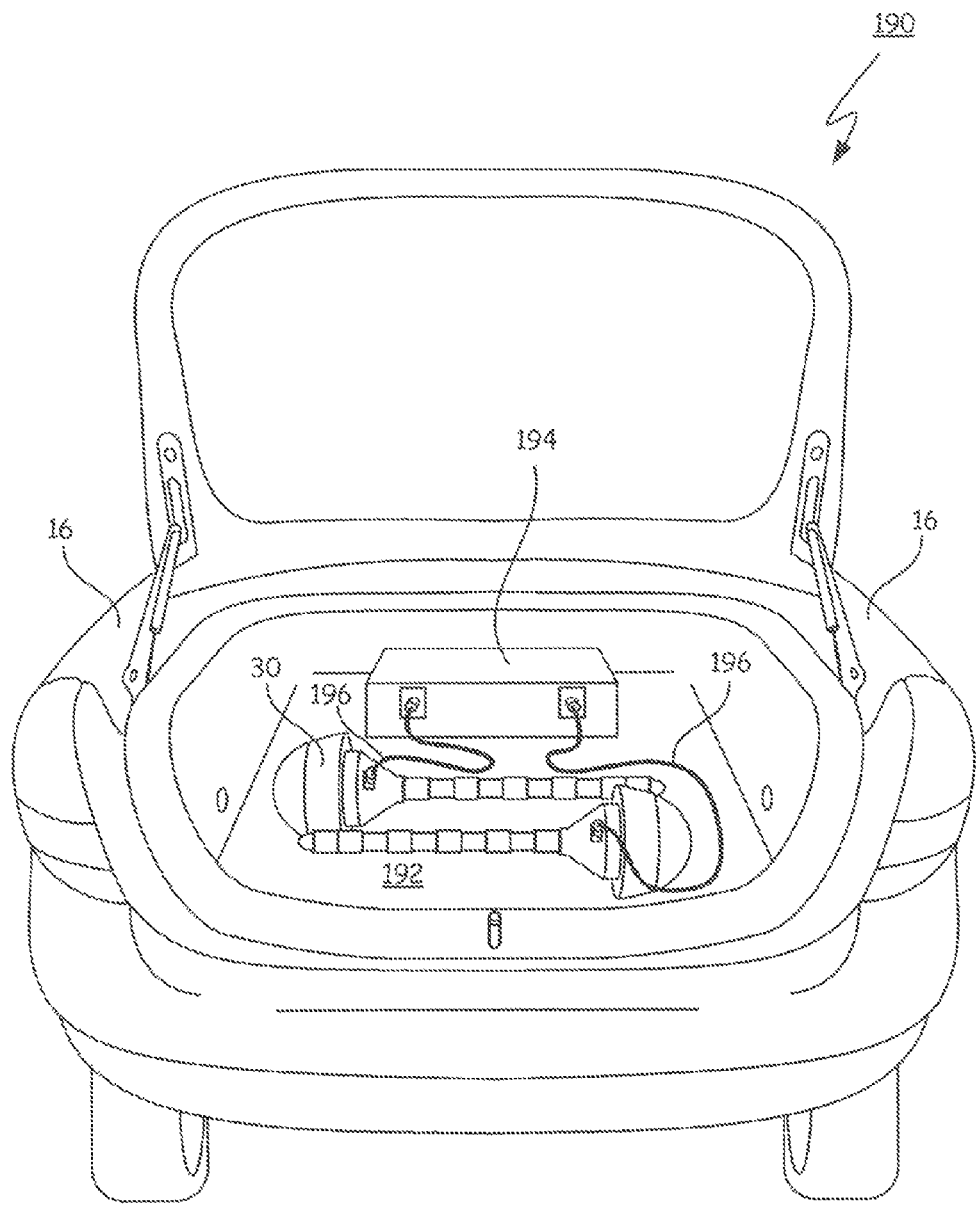
FIG. 13 is a perspective view of two of the safety markers of the present invention stored in the trunk of a police car in a charged state.
Figure 14:
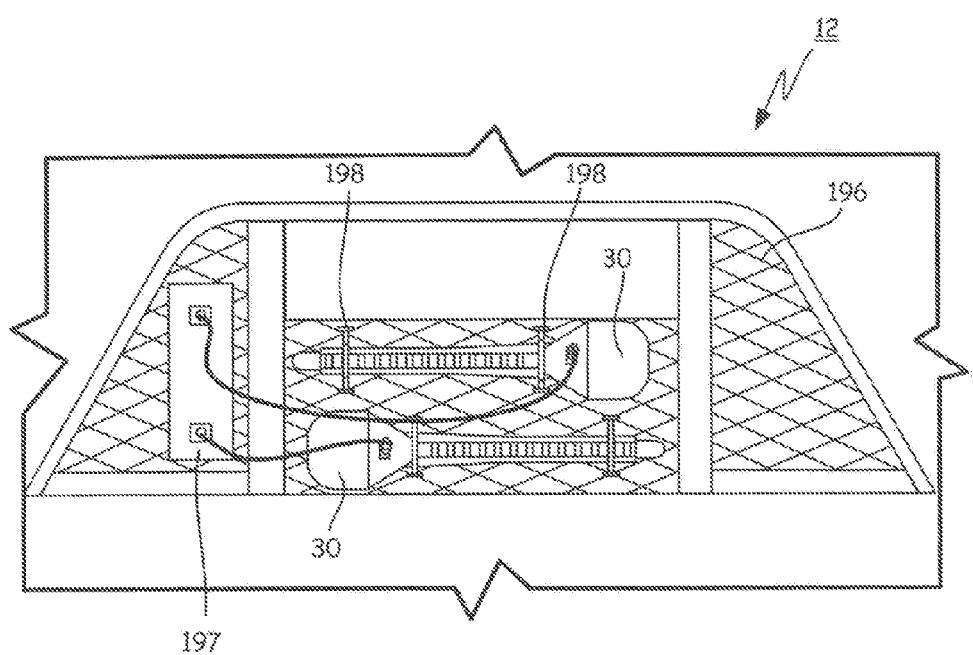
FIG. 14 is a view of two of the safety markers of the present invention stored in a rack secured to the back cage of the interior of a police car in a charged state.
Figure 15:
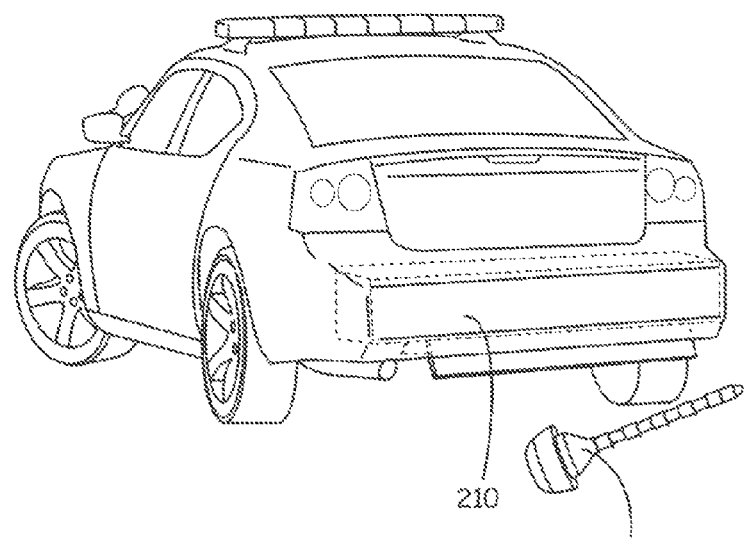
FIG. 15 is a perspective view of a police car equipped with a remotely-actuated, rotated-cradle bumper deployment system for the safety marker of the present invention.

The safety marker 30 of the present invention may be stored in the emergency responder's vehicle, as shown in FIG. 13. In this example, the trunk 192 of a police car 16 can contain a charging station 194. The one or more safety markers 30 stored inside the trunk 192 may be connected via power cords 19% to the charging station 194, so that they are fully charged and ready for deployment if the policeman encounters an accident scene. Alternatively, the trunk may come equipped with a storage bay with a built-in charger for one unit to eight units of the safety markers. The multiple safety markers can be stored, one facing right and one facing left. The charging unit is built into each bay. The individual safety markers snap into the bay for easy usage and charging. In yet another embodiment shown in FIG. 14, a rack 198 containing two safety markers can be connected to the back cage 196 of the police vehicle for easy access and deployment by the policeman. Charger unit 197 keeps the batteries of the safety markers 30 charged for ready use at an accident scene.

Figure 16:
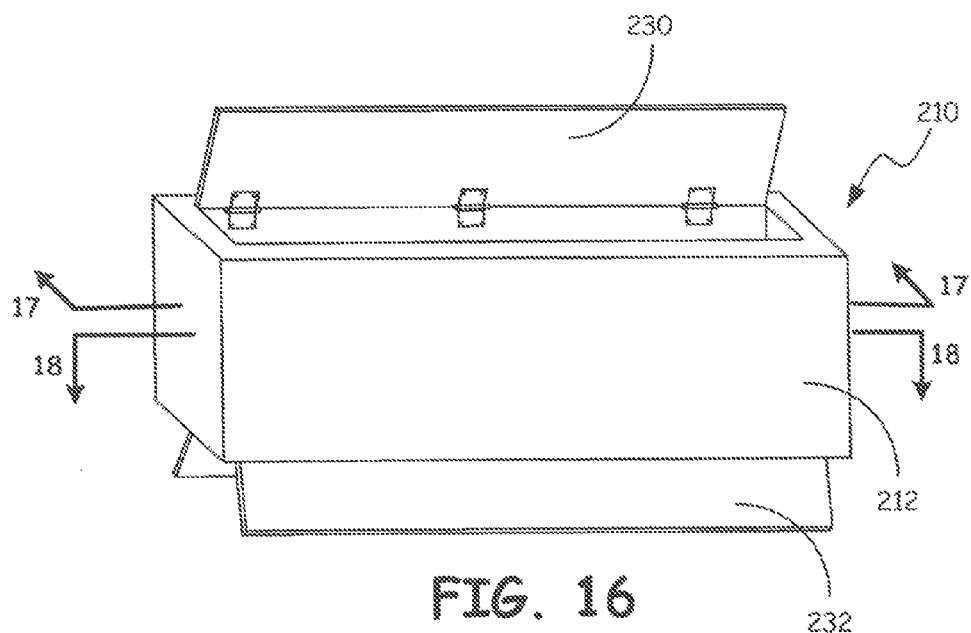
FIG. 16 is a perspective view of the storage/discharge housing for the bumper deployment system shown in FIG. 15.

A preferred embodiment of the invention comprises a remotely-actuated bumper deployment system 210 for the safety markers 30, as shown in FIGS. 15-19b. A deployment case 212 is contained inside the back bumper of, e.g., a police car, as shown in FIG. 16. It can be attractively designed to appear like a natural extension of the bumper.

Figure 17:
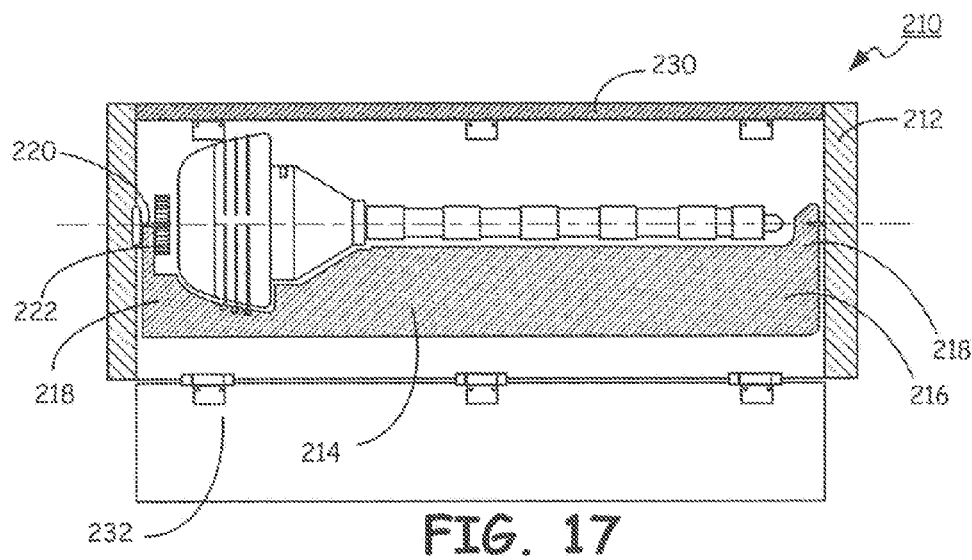
FIG. 17 is a side cut-away view of the storage/discharge housing shown in FIG. 16 with a safety marker shown stored in it.
Figure 18:
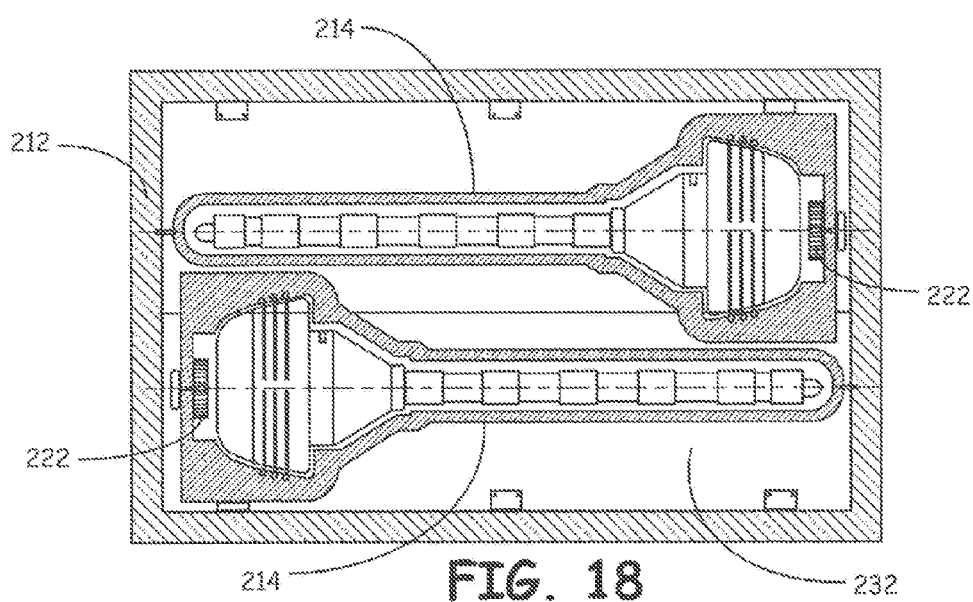
FIG. 18 is a top cut-away view of the storage/discharge housing shown in FIG. 17 with both of the safety markers shown stored in it.

Contained inside the deployment case 212 is a vacuum-formed cradle 214 that bears the contoured shape of two safety markers 30 on their side and protects the safety markers from damage, as shown in FIGS. 17-18. This cradle 214 has a bottom wall 216 and opposite side walls 218. Attached to the side walls 218 are horizontally disposed axes 220. The axes 220 in turn are attached to cog wheels 222. The cog wheels, in turn, are operatively engaged by drive wheels 224 operated by a motor 228.

A lid 230 along the top of the deployment case 212 (see FIG. 16) can be lifted to allow each safety marker 30 to be inserted into its respective cradle 214. The cradles also have electrical contacts around their perimeter to allow the batteries inside the safety markers to be charged while they are stored in the cradles. Doors 232 are disposed across the bottom of the deployment case 212 for discharge of the safety markers.

Figure 19A:
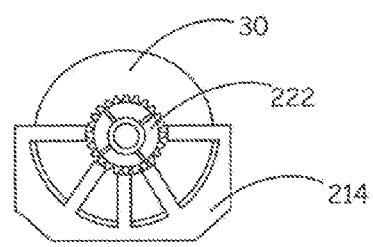
FIG. 19A is a side view of the cradle and cog wheel assembly for the bumper deployment system with the safety marker in its stored condition.
Figure 19B:
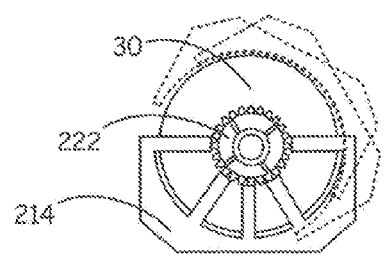
FIG. 19B is a side view of the cog wheel of FIG. 19A rotating the cradle to discharge the safety marker.

FIG. 19A shows the cradle 214 containing a safety marker 30 in its standby storage position. At the push by the policeman of a button located inside the police car, electric current is delivered to the motor 228 inside the deployment case 212. The energized motor causes the drive wheels 224 to in turn rotate the cog wheels 222 engaged by the drive wheels (see FIG. 19B). The rotated cog wheels will rotate the cradle 214 like a carriage until it is turned upside down, as shown in FIGS. 17a and 17b. At the same time, the doors 232 are moved to their open position to create an opening across the bottom of the deployment case 212. The safety marker 30 drops to the ground by means of gravity. Upon hitting the ground, it will self-actuate to extend the light array panel 44 and turn on all on-board electronics including the lights 52, leaving the emergency responder to continue on with his work. In this manner, the emergency responder can deploy one or more safety markers 30 ahead of the accident scene on or along the roadway 14 without leaving his vehicle to provide a warning if an oncoming motorist should strike the deployed safety marker 30. The emergency responder may perform this deployment of the safety markers remotely without any need to get out of the car and face the risk of physical injury caused by reckless-driven oncoming vehicles. When the accident scene is cleared, the emergency responder may simply back up the car and reach down through the window to retrieve each deployed safety marker unit, returning them to the carriage on the beck bumper when time permits.

The deployment case 212 or cradle 214 may also be equipped with a heater that warms the safety markers 30 stored therein to prevent them from freezing.

Figure 20:
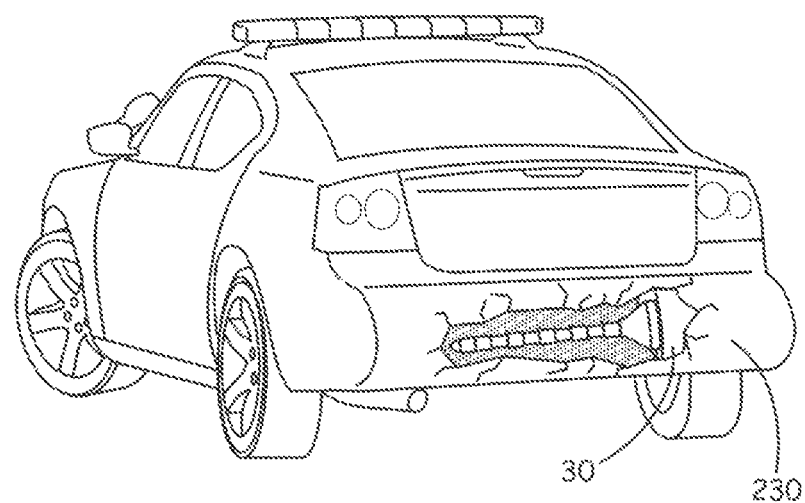
FIG. 20 is a perspective view of a police car equipped with a remotely-actuated, breakable housing bumper deployment system for the safety marker of the present invention.
Figure 21:
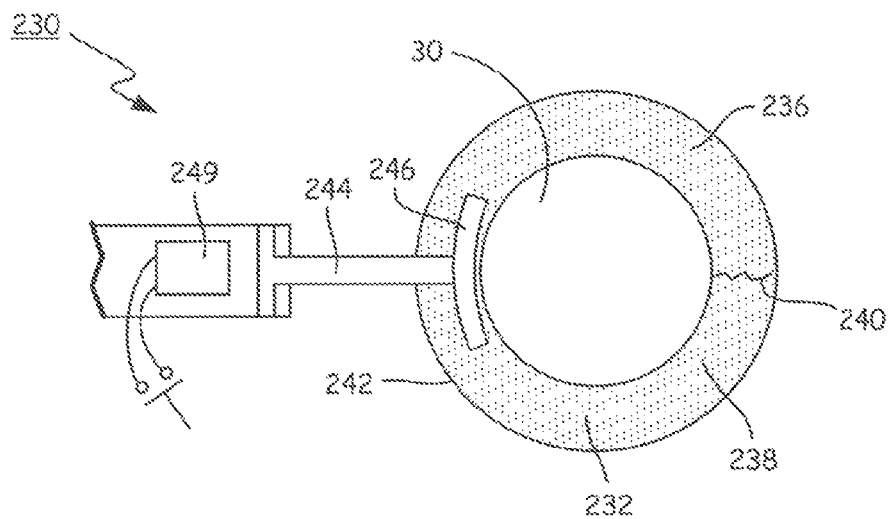
FIG. 21 a cut-away view of the breakable housing and squib-actuated piston assembly for the bumper deployment system of FIG. 20.
Figure 22:
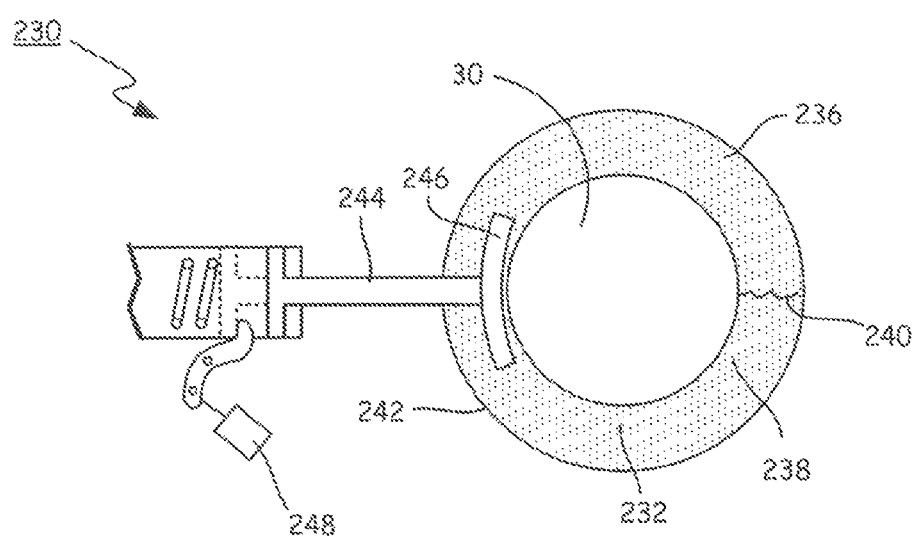
FIG. 22 a cut-away view of the breakable housing and spring-actuated piston assembly for the bumper deployment system of FIG. 20.

In another embodiment of the remote deployed device 230 shown in FIGS. 20-22, the safety marker 30 is stored in a horizontal orientation inside "breakable" housing 232 having a bottom wall 234 (see FIG. 20). As shown more clearly in FIGS. 21-22, the housing comprises two housing halves 236 and 238 that separate along break line 240. The housing halves may optimally be hinged along point 242. Piston 244 having bearing surface 246 extends inside the housing walls adjacent to the side of the safety marker when the piston is in its retracted position. A push button in the emergency responder's vehicle may be pressed by the emergency responder to deliver electrical current to an electric actuator 248 (see FIG. 22) or an explosive squib 249 (see FIG. 21) that are actuated to move the piston 244 and bearing surface 246 to the right to physically push the safety marker against the housing walls 336 and 238 to break them open along point 240 to release the safety marker. The safety marker will fall to the ground for deployment to extend the light wand and turn on its lights, as described above.

Figure 23:
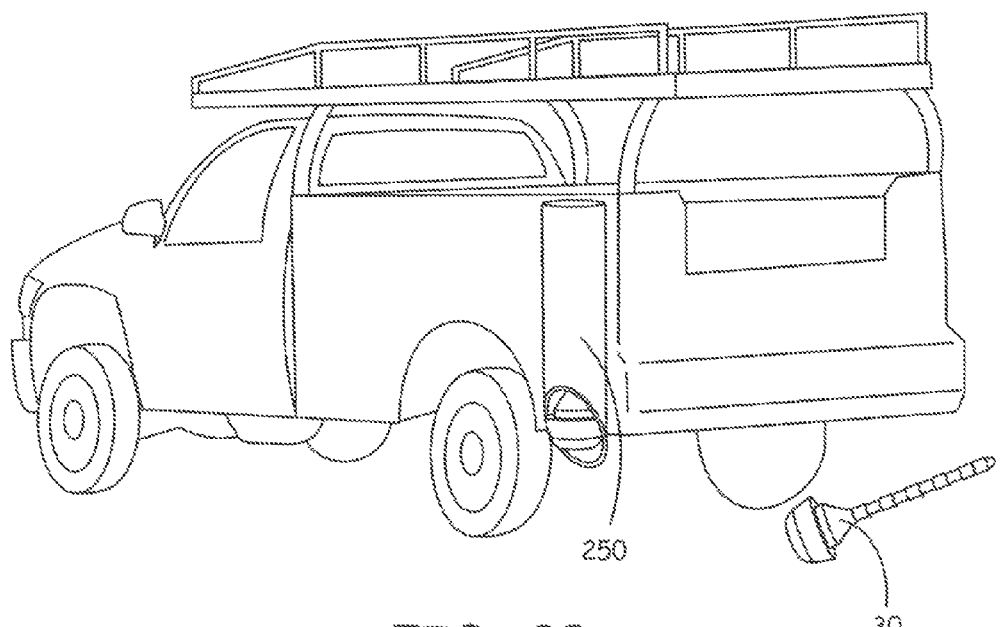
FIG. 23 is a perspective view of a utility truck equipped with a remotely-actuated, gravity drop deployment system for the safety marker of the present invention.

Still another remotely-actuated deployment system 250 is shown in FIGS. 23-25. It comprises a vertically disposed tubular housing 252 which is ideal for taller emergency vehicles like ambulances, fire trucks, or highway construction or maintenance trucks (see FIG. 23). The safety marker 30 is stored vertically within the housing 252, held in position by a pin 256 operably mounted in the housing wall that extends into a niche 258 formed in the base 32 of the safety marker, as shown in FIG. 24. Alternatively, it can rest upon a pair of spring-actuated doors 254 that close off the bottom opening of the housing, as shown in FIG. 25.

When the emergency responder wishes to deploy the safety marker, he pushes a button located inside the emergency vehicle. The pushed button delivers electrical current to an electric actuator or a cable-actuated latch which operates to withdraw pin 256 from engagement with the niche 258 in the safety marker. This allows the safety marker to drop by means of gravity against bottom doors 254. The weight of the safety marker overcomes the bias force of the spring to push the doors 254 to their opened position. In this manner, the safety marker is free to fall to the ground. Upon hitting the ground, it will self-actuate to extend the light array panel 44 and turn on all on-board electronics including the lights 52, leaving the emergency responder to continue on with his work. In this manner, the emergency responder can deploy one or more safety markers 30 ahead of the accident scene on or along the roadway 14 without leaving his vehicle to provide a warning if an oncoming motorist should strike the deployed safety marker 30. The emergency responder may perform this deployment of the safety markers remotely without any need to get out of the car and face the risk of physical injury caused by reckless-driven oncoming vehicles. When the accident scene is cleared, the emergency responder may simply back up the car and reach down through the window to retrieve each deployed safety marker unit, returning them to the carriage on the back bumper when time permits.

Under the present invention, the safety marker 30 may preferably also contain a transmitter 285 for emitting an emergency radar signal. Instead of detecting the proximity of an incoming vehicle driving at a dangerous speed, this transmitter constantly sends out a feedback radar signal triggered by the deployment of the safety marker, itself. Some models of cars and trucks today are equipped with on-board radar capabilities used to detect objects like other cars and animals in front of the vehicle and alert the driver to the presence of that object, so that the driver can apply the brakes to stop the vehicle in time before a crash occurs. Some such vehicles even contain systems for automatically applying the brakes to avoid a crash. The emergency radar signal of the present invention is transmitted at the same frequency used by the onboard radar safety devices in the vehicles in order to trigger an audible or dashboard warning light provided to the driver to alert him to slow down or switch lanes to avoid the accident scene ahead on or beside the roadway 14. This feature is very useful in foggy conditions when visibility for drivers is low.

Another feature of the safety marker 30 intended to enhance the safety of the emergency responder is based upon GPS tracking technology. A GPS tracking unit is a device that uses the Global Positioning System to determine the precise location of a vehicle, person, or other asset to which it has been attached, and to record the position of that asset at regular intervals. The recorded location data can be stored within the tracking unit, or it may be transmitted to a central location database, or Internet-connected computer, using a cellular (GPRS or SMS), radio, or satellite modem embedded in the unit. This allows the asset's location to be tracked using GPS tracking software.

A GPS tracker 290 contains a GPS module to receive the GPS signal, and to calculate coordinates. The tracker acts as a data pusher to send the position of the safety marker 30 to a pre-designated server at, e.g. the central dispatcher for the emergency responder's department. When the high-impact sensor switch 60 is triggered by an incoming vehicle striking the safety marker 30, the sensor sends a signal to the GPS tracker 290 to prompt it to send the location coordinates for the safety marker and associated accident scene to the central dispatcher. In this manner, the central manager can promptly contact the emergency responder by radio communication to determine whether he has been injured by the incoming motorist's vehicle, and send backup emergency responders if needed.

Another useful functionality for the GPS tracker 290 is as a locator for planning purposes, as shown in FIG. 26. The safety marker 30 has a manual activation switch 116. An emergency responder arriving at a potentially hazardous emergency site like a landslide that is covering a road, or a bridge that is damaged can deploy the safety marker as described above, and then use the manual switch 116 to send the specific location of the safety marker to the central dispatcher via the GPS tracker 290. The emergency responder can leave the safety marker 30 behind if he needs to leave the emergency scene to address another situation elsewhere. The central dispatcher can send backup emergency responders or road construction crews to the emergency scene with confidence that they can use the GPS coordinate signals pushed out by the deployed safety marker 30 to find the correct accident scene.

Yet another useful functionality for the safety marker 30 of the present invention is for GPS triangulation. Helicopters are often sent to accident or emergency scenes. The GPS triangulation is based on three or four safety markers 30 that will be placed at precise locations to achieve maximum accuracy for ILS landings, as shown in FIG. 27. The emergency responder will survey the accident scene or emergency scene location, looking for overhead power or telephone wires and other obstructions like trees. They would then choose a starting point. A programmed iPad will show the person activating the triangulation program exactly where to place three or four safety markers. The software positioning program will not allow any of the safety markers to be activated until they are deployed at the exact position for a safe helicopter approach. This means that within the designated space defined by the deployed safety markers, there will be plenty of room for a helicopter to descend and land safely. The safety markers will also activate the LED lights and strobes for a visual approach by the helicopter pilot. As long as the helicopter stays within the triangulated area, the helicopter will have a safe descent.

Still another useful functionality for the safety marker 30 of the present invention is the inclusion of a gunshot sensor 270 (see FIG. 4). Emergency responders to an accident or crime scene may expose themselves to gun fire, particularly in high-crime urban areas. An emergency responder like a policeman may not be on the look out for a potential shooter because the immediate focus is on the investigation at the accident or crime scene or providing help to injured victims.

A policeman who is shot may not necessarily be able to radio to his central dispatch unit for assistance. This problem is compounded by the fact that police or other law enforcement departments frequently staff a car with a single policeman without a partner who can provide assistance to the injured policeman or radio for help. Therefore, a gunshot sensor 270 contained within the deployed safety marker 30 at the accident scene that can detect the gun shot and transmit this information to the central dispatcher along with the GPS location coordinates for the safety marker and associated accident scene where the potentially shot policeman is located would be enormously helpful.

There are three primary attributes that characterize gunfire and hence enable the detection and location of gunfire and similar weapon discharges. An optical flash occurs when an explosive charge is ignited to propel the bullet from the chamber of the gun. A muzzle blast also occurs when the explosive charge is ignited to propel the bullet from the chamber of the weapon. A typical muzzle blast generates an impulse sound wave with a sound pressure level that ranges from 120 dB to 160 dB. Finally, a "snap" or "crack" occurs as the bullet moves through the air at supersonic speeds.

The gunshot sensor 270 may use sound and visual or infrared light to detect the incidence of the gunshot. For example, SST, Inc. of Newark, California produces a gunshot detection system called "ShotSpotter" that uses acoustical sensors in the form of microphones and related equipment to detect the sonic boom from the muzzle blast, indicating the possible occurrence of a gunshot. It uses algorithms to determine whether the noise was emitted by a firearm, as opposed to a fireworks display or car backfiring.

Optical or electro-optical systems detect either the physical phenomenon of the muzzle flash of a bullet being fired or the heat caused by the friction of the bullet as it moves through the air. Such systems require that they have a line of sight to the area where the weapon is being fired or the projectile while it is in motion. Although a general line of sight to the shot event is required, detections are sometimes available as the infrared flash event bounces off surrounding structure. Just like acoustic based systems, electro-optical systems can generally be degraded by specialized suppression devices that minimize their sound or optical signatures.

Acoustic and optical sensors can be co-located and their data can be fused thereby enabling the gunshot location processing to have a more exact discharge time that can be used to calculate the distance of the discharge to the sensors with the greatest possible precision. Optical systems are (essentially) not limited to the number of individual shots being fired or the number of different shooters simultaneously shooting, which allows optical-based sensing to easily declare and locate shooters conducting ambushes that employ multiple shooters, shooting from multiple locations during the same time period.

The gunshot sensor 270 contained in the safety marker 30 of the present invention can also be used to locate the gunshot. In this case, multiple gunshot sensors 270 located in multiple safety markers or on a police car can be used to enable the process of acoustic triangulation. Because the speed of sound is a known entity—340.29 meters per second (0.21 miles per second) at sea level—the difference in the time it takes for the sound of a gunshot to reach three different sensors can determine the location of that gunshot. Using a built-in GPS system as an accurate time source, three sensors work together to triangulate the location from which a shot was fired. For example, a shot is fired somewhere in the city near the accident scene. Sensor 1 picks up the sound of the shot. Since each acoustic sensor has a range of about 2 miles, all we know right now is that the shot was fired within a 2-mile radius of Sensor 1. One second later, a second sensor picks up the sound waves of a gunshot. If sound in this city travels at about 0.21 miles per second, we now know that the shot was fired approximately one-fifth of a mile farther away from Sensor 2 than from Sensor 1. We can draw a circle representing the perception radius of Sensor 2 overlapping the perception radius of Sensor 1—since both sensors picked up the sound waves, the shot must have been fired within the overlapping coverage areas. Where the two circles intersect, we have two possible locations for our gunshot. To figure out which of these two points is the location from which the shot was fired, we need to find a third sensor that picked up the sound of the shot. A third sensor, located to the south of Sensors 1 and 2, picked up the sound waves a half-second after Sensor 2 detected them. This would put the origin of the sound about one-tenth of a mile farther from Sensor 3 than from Sensor 2. We now have our gunshot location, at least in terms of distance from the sensors. The system then uses built-in GPS receivers to convert that known point into latitude and longitude coordinates, and passes the information to the central dispatcher. The ShotSpotter system uses such acoustical triangulation to detect the location of gunshots. According to SST, the system is accurate to 25 meters (82 feet) or less—far less than the length of a typical city block. Because the sensors themselves are about the size of a thick stick of gum, they can easily fit inside the safety marker 30.

Figure 28:
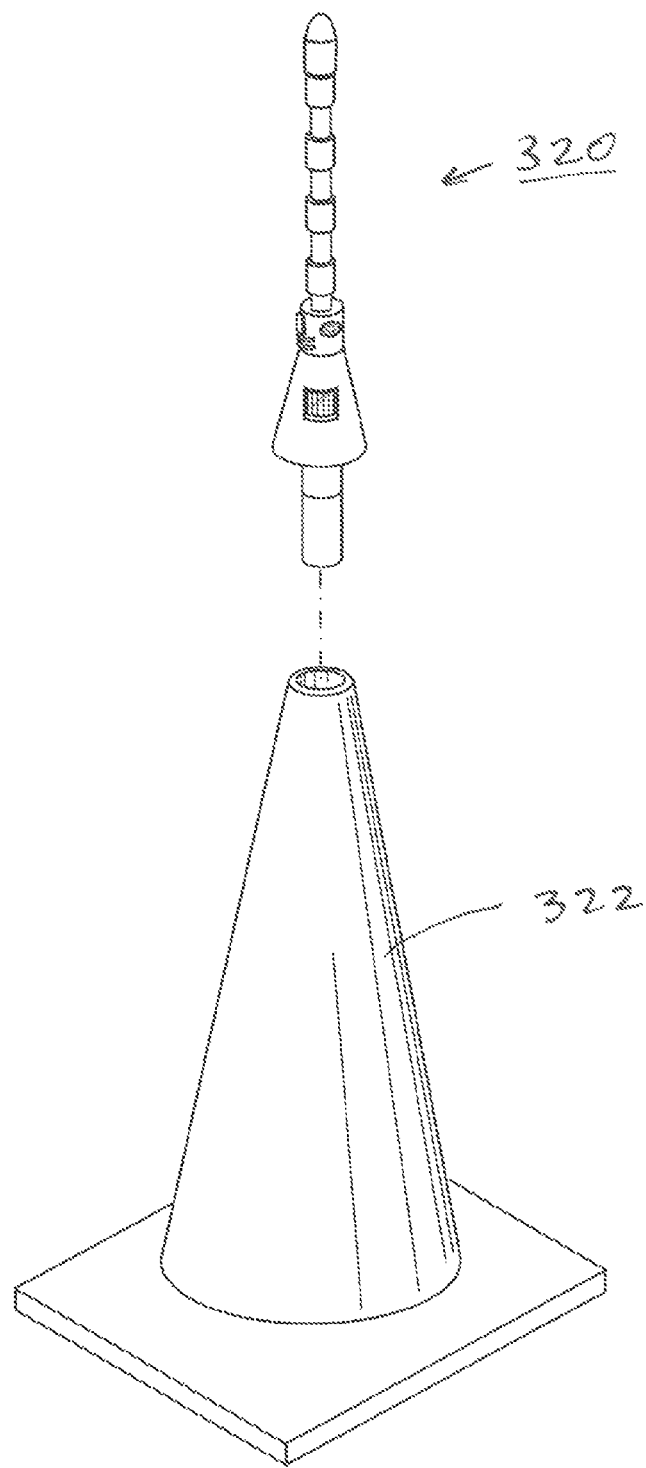
FIG. 28 is a perspective view of a hand-held safety marker of the present invention that can be mounted to the top of a traffic safety cone to create a deployed safety marker at an accident scene.

In another embodiment of the safety marker system of the present invention, the safety marker can comprise a hand-held device 320, as shown in FIG. 28. It comprises a power source, a light panel, a protective shield for the light panel, and electronic circuitry for controlling the operation of the lights in a predetermined frequency or pattern. One or more of the lights may be colored or operate in a strobe pattern for enhanced visibility for the motorists.

Figure 29:
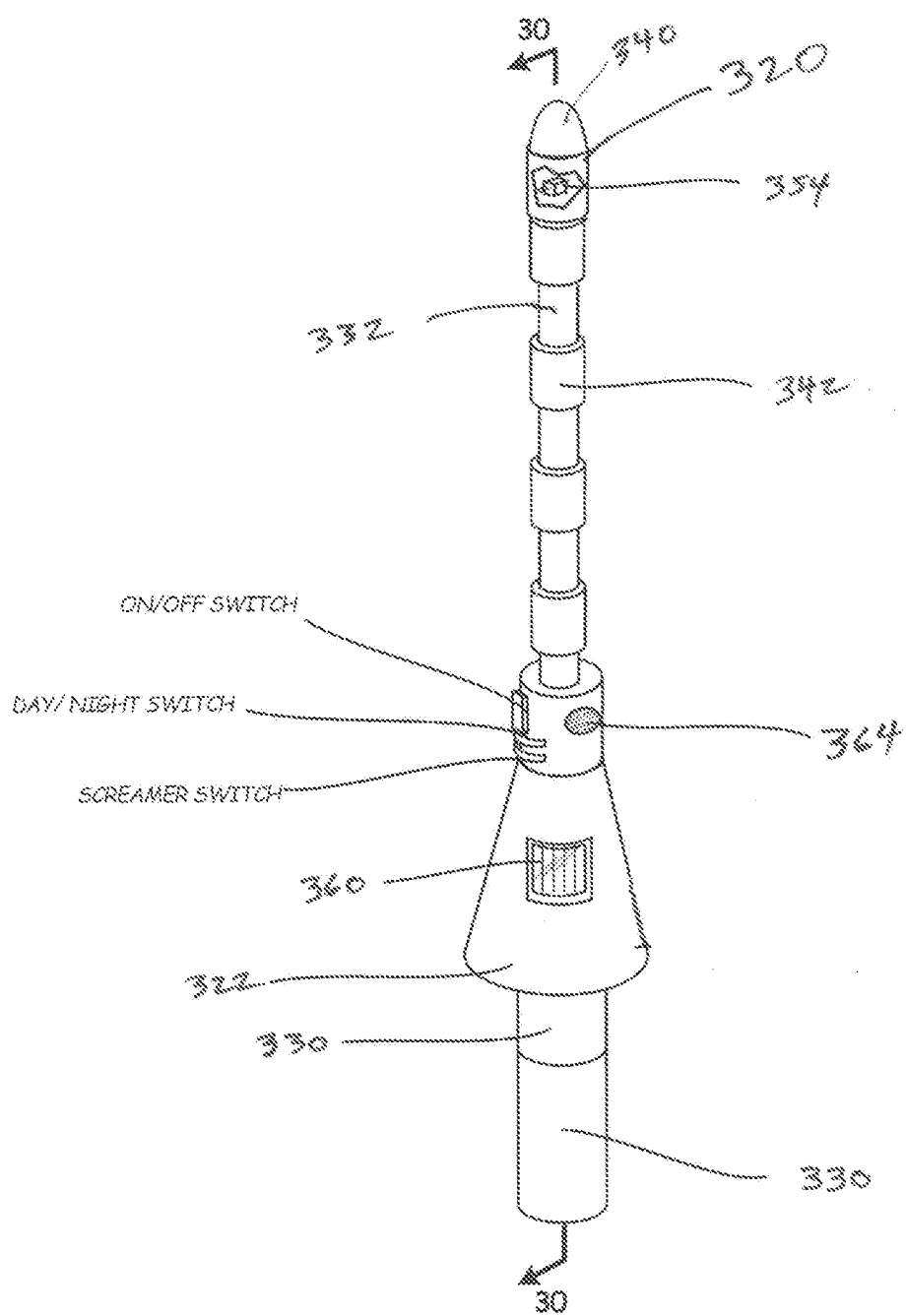
FIG. 29 is a perspective view of the hand-held safety marker of FIG. 28.

The safety marker 320 is shown more clearly in FIG. 29. It compromises a handle 330. A plurality of batteries 331 are positioned inside the handle. These batteries are wired together to provide the necessary electrical power source to the light bulbs of the light array wand 332 in the safety marker 320. The batteries may be replaceable. Alternatively, they may be rechargeable with a plug provided in the handle sidewall for a power cord. By positioning the batteries in the handle, they are protected from moisture and other adverse weather elements.

Also located within handle 330 above the battery pack 331 is lower electronics housing 334 with upper electronics housing 336 above it. Extending from the top of handle 330 radiating around its perimeter is collar 338. Extending vertically from the top of upper electronics housing 336 is light array wand 332. Similar to the stand-alone safety marker 30 described above, the wand comprises a light array panel contained inside a transparent carrier tube 333. The light array panel comprises a core substrate, which can adopt any suitable shape such as a square prism or a cylinder. It preferably is three-dimensional for providing surfaces that are visible in 360°. The carrier tube 333 is preferably cylindrical with a circular cross section since such a shape will accommodate a square prism or cylindrical core substrate. But, the carrier tube may adopt any other shape such as a square, triangular, or rectangular cross section that is capable of containing the shape of core substrate, and protecting it from the weather elements (i.e., rain, mow, sunshine, heat).

Positioned along the core substrate are a plurality of light bulbs 338. These light bulbs may compromise incandescent, LED, CFL, fluorescent lamps, or any other suitable emitter of light. The light bulbs may be positioned in a single row or multiple rows along the core substrate. Preferably, the light bulbs are positioned sufficiently around the perimeter of core substitute to enable the core substrate to emit light in an arc of 90-360°, preferably 150-360°, even more preferably 360°. In this manner, an approaching motorist will see the light emitted by the light bulbs positioned along core substrate regardless of the specific orientation of the safety marker 120 along roadway 12 with respect to the angle of the approaching motorist. Light output is measured primarily in lumens. A single LED bulb can produce from 2 to 200 lumens in light output depending upon how it is driven. Adding more individual LED bulbs will increase the lumen output. The light bulbs 338 contained in the light may wand should produce approximately 2 to 20,000 lumens of light output.

The light bulbs 338 contained in the light array wand may be colored for added visibility to the approaching motorist. For example, the light bulbs may be red or blue, which are colors reserved for police and other law enforcement officials. Alternatively, the light array may be broken up into alternating segments of red and blue lamps. In another alterative embodiment, all the lamps in the light array may be white with the transparent carrier tube instead colored red or blue or alternating red and blue segments.

Because the safety marker 320 of the present invention is also useful for non-law enforcement personnel, such as tow truck operators, road construction crews, or utility equipment repairmen, the light array may contain instead yellow light bulbs. Alternatively, it may contain white light bulbs shining through a yellow-colored transparent carrier tube. Yellow safety warning lights are widely associated by motorists with a construction or repair scene that requires motorists to slow their speed to pass or switch to a lane further away from the stopped vehicles to pass.

To add further visibility to the safety marker 320 of the present invention, the lights 338 contained in the light array panel 332 may blink on and off in a constant or timed cycle. A strobe light beacon 340 may also be positioned on top of the light array wand to emit a pulsating white light.

To address reduced night-time visibility, one or more bands 342 of fluorescent color like orange, yellow, or green may be positioned along the circumference of light wand 332. The bands will be reflected by the headlights of approaching motorists. They may be provided to the stanchion tube by means of paint or reflective tape.

Contained inside the lower electronics housing 334 are a plurality of circuit boards 348 that provide the necessary electronic circuitry for the operation of safety marker 320. This includes the circuitry 350 connected to the screamer module 352 and its circuitry connected to the high-impact sensor switch 354 that in turn is located near the top of the light array wand 332; and early-warning radar transponder 356 and its circuitry that transmits a warning signal to on-board radar signal receivers that that are increasingly available in automobiles as a safety feature. Such on-board receivers will receive and communicate to the oncoming driver a transmitted warning signal or message for the accident scene ahead along the roadway to enhance the chances of the driver slowing down his speed or switching to the left-hand lane in order to exercise caution when passing the accident scene.

Mounted to the exterior of the housing 334 is a small solar panel 360 that captures sunlight and converts it into on-board photovoltaic power for the safety marker. Circuitry contained inside the electronics bay 334 provides this photovoltaic power as electric current to the circuit boards 348 and electronic components contained inside the safety marker to extend the battery life of the safety marker.

Upper electronics housing 336 contains GPS location detector and transmitter 362 described more fully below for producing location coordinates for the safety marker. This data is transmitted to a central dispatcher as described above for providing an accurate location of the accident scene in case backup assistance needs to be sent to the emergency responders at the accident scene.

Screamer speaker 364 is mounted to the exterior of housing 336. This speaker is connected via its electrical circuit to screamer module 366 to emit the emergency warning sound or message if an oncoming motorist strikes the safety marker 320 near the accident scene and actuates high-impact sensor switch 354. This warning sound or message enables the emergency responder at the accident scene to jump to a safe location to avoid physical injury.

Also mounted to upper electronics housing 336 is on/off switch 370. The emergency responder can use this switch 370 to manually turn on and off lights bulbs 338 contained in the hand-held safety marker 320. Unlike safety marker 30, this hand-held embodiment 320 of the safety marker device does not contain a low-impact sensor switch that is actuated when the safety marker is dropped on the ground or other hard surface. Instead, it must be manually turned on.

Also mounted to upper electronics housing 336 is screamer switch 372. This switch is used by the emergency responder to manually turn on and off the screamer module 366 that emits the emergency warning sound or message if an oncoming motorist strikes the safety marker 320 near the accident scene ad actuates high-impact sensor witch 354.

Finally day/night switch 374 is mounted to upper electronics housing 336. LED bulbs 338 in particular need to be bright enough during daylight hours to be seen by oncoming motorists. But, their high lumen intensity often makes them too bright during nighttime hours. Thus, this switch 374 may be integrated with the circuitry for the lights 338 to either turn off some of the light bulbs during nighttime deployment hours, turn on and off separate sets of light bulbs having different wattages for daylight versus nighttime hours (higher wattages for daylight, lower wattages for nighttime), or act to reduce the voltage directed to the light bulbs to dim their lumen intensity.

Finally, mounted to lower electronics housing 334 is gunshot sensor 378, as further described below.

The hand-held unit 320 may be used by an emergency responder to direct traffic at an accident scene, or to set up a work zone for utility workers, highway construction or maintenance workers, etc. The emergency responder or other user of the device may turn on the light bulbs 338 contained inside the light array wand 332 using the on/off switch 370 as described above, and direct oncoming vehicular traffic with confidence that the directions or other motions will be seen by the drivers.

Figure 30:
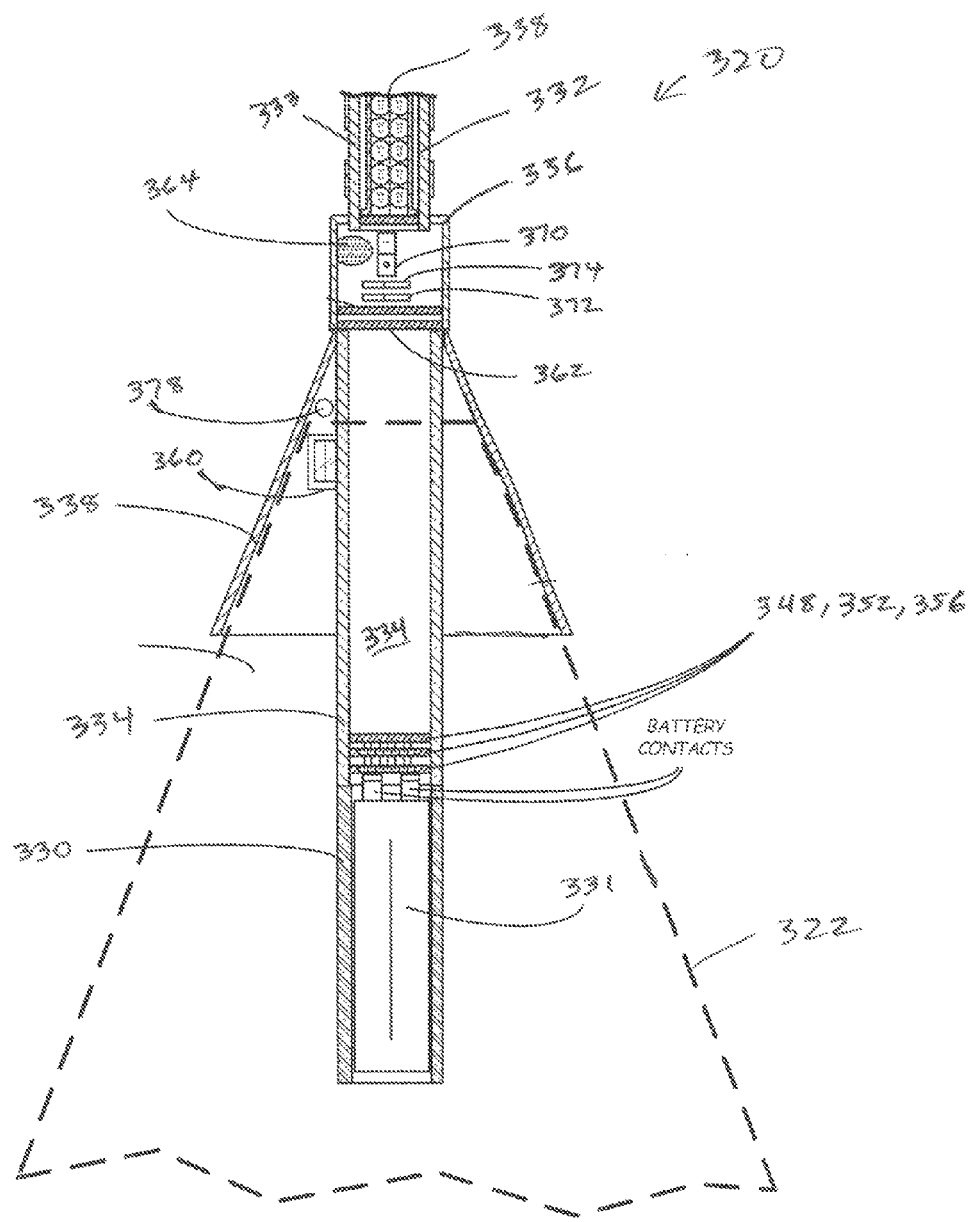
FIG. 30 is a side cut-away view of the hand-held safety marker of FIG. 29.

Alternatively, the collar 322 connected around the handle 330 of the safety marker 320 allows the device to be conveniently mounted to the top of a conventional traffic cone 322 to provide a deployed, lighted safety marker, as shown in FIGS. 28 and 30. Accordingly, it is important to enhance the safety and well-being of an emergency responder at an accident scene. Therefore, an incursion detection system is provided in the form of the high-impact sensor switch 354 that is positioned near the top of the light array wand 332 of the safety marker 320. It comprises an inertia switch or a shock sensor switch, such as the ones available from Select Controls, Inc. of Bohemia, N.Y. The high-impact sensor switch operates to measure the degree of impact created on the safety marker by an incoming motor vehicle driven by an inattentive, impaired, or reckless motorist hitting the safety marker, and may be adjusted for a predetermined triggering speed threshold. If the impact exceeds the equivalent of, e.g., twenty miles per hours, then the high-impact sensor will actuate via a separate switch in the circuitry an on-board screamer device which is connected to a speaker mounted to the base of the safety marker 320. The screamer device will emit a loud wailing sound or audible warning message that can be heard by the emergency responder. By prepositioning the safety marker 320 a predetermined distance from the accident scene towards the oncoming traffic (e.g., 30 feet), and turning on switch 372 to activate the screamer functionality, sufficient time will be provided after an oncoming motorist's vehicle strikes the safety marker and the screamer device emits its wailing sound or warning message for the emergency responder to jump out of harm's way.

As an additional safety measure, the emergency responder may be equipped with a small remote transponder containing a speaker worn on, e.g., the lapel of his uniform. The speaker may contain a radio frequency receiver in communication with a corresponding RF transmitter connected to the screamer device in the base of the safety marker. This will enable the wailing sound or audible warning message emitted by the screamer device to be transmitted directly to the lapel remote speaker so that the emergency responder can more easily hear the warning above the traffic noise before the oncoming motorist strikes him.

The safety marker 320 may preferably also contain the transmitter 356 for emitting an emergency radar signal. Instead of detecting the proximity of an incoming vehicle at a dangerous speed, this transmitter constantly sends out a feedback radar signal triggered by the deployment of the safety marker, itself. Some models of cars and trucks today are equipped with on-board radar capabilities used to detect objects like other cars and animals in front of the vehicle and alert the driver to the presence of that object, so that the driver can apply the brakes to stop the vehicle in time before a crash occurs. Some such vehicles even contain systems for automatically applying the brakes to avoid a crash. The emergency radar signal of the present invention is transmitted at the same frequency used by the onboard radar safety devices in the vehicles in order to trigger an audible or dashboard warning light provided to the driver to alert him to slow down or switch lanes to avoid the accident scene ahead on or beside the roadway 12. This feature is very useful in foggy conditions when visibility for drivers is low.

Another feature of the safety marker 320 intended to enhance the safety of the emergency responder is based upon GPS tracking technology. The GPS tracking unit 362 is a device that uses the Global Positioning System to determine the precise location of a vehicle, person, or other asset to which it has been attached, and to record the position of that asset at regular intervals. The recorded location data can be stored within the tracking unit, or it may be transmitted to a central location database, or Internet-connected computer, using a cellular (GPRS or SMS), radio, or satellite modem embedded in the unit. This allows the asset's location to be tracked using GPS tracking software.

A GPS tracker contains a GPS module to receive the GPS signal, and to calculate coordinates. The tracker acts as a data pusher to send the position of the safety marker 320 to a pre-designated server at, e.g. the central dispatcher for the emergency responder's department. When the high-impact sensor switch is triggered by an incoming vehicle striking the safety marker 320, the sensor sends a signal to the GPS tracker to prompt it to send the location coordinates for the safety marker and associated accident scene to the central dispatcher. In this manner, the central manager can promptly contact the emergency responder by radio communication to determine whether he has been injured by the incoming motorist's vehicle, and send backup emergency responders if needed.

Another functionality for the GPS tracker is as a locator for planning purposes. An emergency responder arriving at a potentially hazardous emergency site like a landslide that is covering a road, or a bridge that is damaged can deploy the safety marker 320 on top of a traffic cone 322, as described above, and then use the manual switch to send the specific location of the safety marker to the central dispatcher via the GPS tracker. The emergency responder can leave the safety marker 320 behind if he needs to leave the emergency scene to address another situation elsewhere. The central dispatcher can send backup emergency responders or road construction crews to the emergency scene with confidence that they can use the GPS coordinate signals pushed out by the deployed safety marker 120 to find the correct accident scene.

Finally, gunshot sensor 378 contained in the safety marker 320 when deployed at an accident scene or crime scene will allow the occurrence of a gunshot to be transmitted to a central dispatcher for emergency assistance provided to the possibly injured emergency responder. It can also determine the location of the gunshot via acoustical triangulation, as described above, to send that information to the central dispatcher too.

The above specification and drawings provide a complete description of the emergency safety marker system and associated method of the present invention. Since many embodiments of the invention can be made without departing from the spirit and scope of the invention, the invention resides in the claims hereinafter appended.

We claim:

1. An electronic safety marker deployed by an emergency responder on or along a roadway for providing a warning to oncoming vehicles approaching an accident scene having a boundary defined by the positioned safety marker, the safety marker comprising:
   (a) a source of electrical current;
   (b) electrical circuitry connected to the source of electrical current;
   (c) a self-righting base comprising a housing defining an interior chamber and attachment means along its top surface;
   (d) a light wand attached at its bottom end to the attachment means in the base, the light wand comprising a plurality of lights connected to the electrical circuit;
   (e) impact-actuated deployment means interposed in the electrical circuit, and positioned inside the chamber in the base;
   (f) a sensor switch positioned inside the light wand or base of the safety marker and connected to the electrical circuit and an emergency warning emission mechanism;
   (g) wherein when the safety marker is released from above ground level by the emergency responder and hits the ground or other hard surface, the impact-actuated deployment means is actuated upon impact to deliver electrical current to the plurality of lights to turn them on to a lighted state to provide warning of the accident scene to the oncoming vehicles, and the safety marker automatically orient[s] itself to an upright, vertical position; and
   (i) wherein when the safety marker is struck by an incoming vehicle, the sensor switch positioned inside the light wand or base of the safety marker delivers current to the emergency warning emission mechanism to produce an audible warning alert to the emergency responder of the incoming vehicle approaching the accident scene.

2. The safety marker of claim 1, wherein the impact-actuated deployment means comprises a low-impact sensor switch.

3. The safety marker of claim 1, wherein the impact-actuated deployment means comprises a first contact plate and a second contact plate positioned in substantially parallel alignment inside the chamber in the base, wherein the impact upon the base by the ground or other hard surface against the dropped safety marker deflects the first contact plate against the second contact plate to complete an electrical circuit to deliver electrical current to the plurality of lights to turn them on to a lighted state.

4. The safety marker of claim 1 further comprising a stanchion tube telescoping means attached at its bottom end to the attachment means in the base with the light wand slidably contained inside the stanchion tube between a retracted, standby position and an extended, actuated position, wherein when the safety marker is released from above ground level by the emergency responder with the light wand in its retracted, standby position, and the safety marker hits the ground or other hard surface, the deployment means is actuated upon impact to cause the light wand to move to its extended, actuated position, and to its deliver electrical current to the plurality of lights to turn them on to an elevated lighted state to provide warning of the accident scene to the oncoming vehicles.

5. The safety marker of claim 1, wherein the housing of the base comprises an impact-resistant, elastomeric material to enhance the actuation of the impact-actuated deployment mechanism upon impact by the ground or other hard surface against the dropped safety marker.

6. The safety marker of claim 1 further comprising a solar panel positioned along the safety marker for gathering photovoltaic energy to produce supplemental electrical current.

7. The safety marker of claim 1 further comprising a delay circuitry incorporated into the impact-actuated deployment mechanism for producing a delay period after the impact-actuated deployment mechanism is actuated by impact by the ground or other hard surface against the dropped safety marker before the lights in the light wand are turned on.

8. The safety marker of claim 4 further comprising a delay circuitry incorporated into the impact-actuated deployment mechanism for producing a delay period after the impact-actuated deployment mechanism is actuated by impact by the ground or other hard surface against the dropped safety marker before the light wand is moved from its retracted, standby position to its extended, actuated position.

9. The safety marker of claim 1 further comprising a location detector and transmitter that uses GPS triangulation to determine the location of the safety marker, and automatically transmits the GPS coordinates to a central dispatcher or other party associated with the emergency responder to communicate the location of the accident scene.

10. The safety marker of claim 9 further comprising a gunshot sensor that detects the presence of a gun-shot within the proximity of the safety marker, and automatically transmits the occurrence of the gun-shot along with the GPS coordinates for the accident scene to a central dispatcher or other party associated with the emergency responder.

11. The safety device of claim 1 further comprising an early warning radar transponder for transmitting a warning message to an oncoming vehicle of the presence of an accident scene up ahead along the roadway.

12. The safety marker of claim 4, wherein the impact-actuated deployment mechanism comprises a gear and grid strip assembly for moving the light wand to its extended, actuated position in response to the actuation of the impact-actuated deployment mechanism upon impact by the ground or other hard surface against the dropped safety marker.

13. The safety marker of claim 4, wherein the impact-actuated deployment mechanism comprises a gas propulsion assembly for moving the light wand to its extended, actuated position in response to the actuation of the impact-actuated deployment mechanism upon impact by the ground or other hard surface against the dropped safety marker.

14. The safety marker of claim 4, wherein the impact-actuated deployment mechanism comprises a compression spring assembly for moving the light wand to its extended, actuated position in response to the actuation of the impact-actuated deployment mechanism upon impact by the ground or other hard surface against the dropped safety marker.

15. The safety marker of claim 4, wherein the impact-actuated deployment mechanism comprises a jack screw assembly for moving the light wand to its extended, actuated position in response to the actuation of the impact-actuated deployment mechanism upon impact by the ground or other hard surface against the dropped safety marker.

16. The safety marker of claim 1, wherein the safety marker is manually deployed by the emergency responder at the accident scene from the emergency responder's vehicle.

17. The safety marker of claim 1, wherein the safety marker is remotely deployed by the emergency responder at the accident scene by a deployment mechanism associated with the emergency responder's vehicle.

18. The safety marker of claim 17, wherein the remote deployment mechanism comprises a rotated carriage means for dropping the safety marker from a horizontal storage orientation onto the ground or other hard surface for deployment.

19. The safety marker of claim 17, wherein the remote deployment mechanism comprises a piston-actuated means for pushing the safety marker through a break-through housing wall so that the safety marker can drop from a vertical storage orientation onto the ground or other hard surface for deployment.

20. The safety marker of claim 17, wherein the remote deployment mechanism comprises an electrically actuated latch or cable-actuated latch for pulling a pin that secured the safety marker inside a vertical storage housing to allow the safety marker to drop onto the ground or other hard surface for deployment.

21. An electronic safety marker system comprising one or more safety markers of claim 1 deployed by an emergency responder on or around an emergency location.

22. The electronic safety marker system of claim 21, wherein the emergency location comprises an accident scene on or along a roadway to warn oncoming vehicles of the presence of the accident scene.

23. The electronic safety marker system of claim 21, wherein the emergency location comprises a landslide, disabled bridge, or other safety hazard to provide the location to a central dispatcher or other party associated with an emergency responder for follow-up assistance by additional emergency responders.

24. The electronic safety marker system of claim 21, wherein the emergency location comprises a field in which a helicopter needs to land to provide enhanced visibility to the pilot of the location of the landing field.

25. An electronic safety marker deployed by an emergency responder on or along a roadway for providing a warning to oncoming vehicles approaching an accident scene having a boundary defined by the positioned safety marker, the safety marker comprising:
(a) a source of electrical current;
(b) electrical circuitry connected to the source of electrical current;
(c) a base comprising a housing defining an interior chamber and attachment means along its top surface;
(d) a light wand attached at its bottom end to the attachment means in the base, the light wand comprising a plurality of lights connected to the electrical circuit;
(e) impact-actuated deployment means interposed in the electrical circuit, and positioned inside the chamber in the base;
(f) a sensor switch positioned inside the light wand or base of the safety marker and connected to the electrical circuit and an emergency warning emission mechanism;
(g) wherein when the safety marker is released from above ground level by the emergency responder and hits the ground or other hard surface, the impact-actuated deployment means is actuated upon impact to deliver electrical current to the plurality of lights to turn them on to a lighted state to provide warning of the accident scene to the oncoming vehicles; and
(i) wherein when the safety marker is struck by an incoming vehicle, the sensor switch positioned inside the light wand or base of the safety marker delivers current to the emergency warning emission mechanism to produce an audible warning alert to the emergency responder of the incoming vehicle approaching the accident scene.

* * * * *